United States Patent [19]

Matejec et al.

[11] Patent Number: 5,108,883
[45] Date of Patent: Apr. 28, 1992

[54] COLOR PHOTOGRAPHIC RECORDING MATERIAL

[75] Inventors: Reinhart Matejec, Leverkusen; Hans Langen, Boon; Erich Wolff, Solingen, all of Fed. Rep. of Germany

[73] Assignee: Agfa Gevaert Aktiengesellschaft, Leverkusen-Bayerwerk, Fed. Rep. of Germany

[21] Appl. No.: 613,454

[22] Filed: Nov. 9, 1990

Related U.S. Application Data

[63] Continuation of Ser. No. 370,452, Jun. 23, 1989, abandoned.

[30] Foreign Application Priority Data

Jul. 7, 1988 [DE] Fed. Rep. of Germany ....... 3823020

[51] Int. Cl.$^5$ ................................................ G03C 1/46
[52] U.S. Cl. .................................... 430/504; 430/507; 430/552; 430/553; 430/522
[58] Field of Search ............... 430/504, 507, 522, 553, 430/552

[56] References Cited

U.S. PATENT DOCUMENTS

| | | | |
|---|---|---|---|
| 3,547,640 | 12/1970 | Beckett et al. | 430/504 |
| 4,333,999 | 6/1982 | Lau | 430/533 |
| 4,690,889 | 9/1987 | Saito et al. | 430/552 |
| 4,851,327 | 7/1989 | Fuchizawa et al. | 430/526 |

Primary Examiner—Charles L. Bowers, Jr
Assistant Examiner—Thomas R. Neville
Attorney, Agent, or Firm—Connolly and Hutz

[57] ABSTRACT

Color photographic recording material containing as cyan correction dyes, azomethine dyes corresponding to the general formula IV or V is distinguished from materials containing the cyan correction dyes hitherto used by its increased stability of latent image nuclei when stored under tropical conditions (35° C. at 90% relative humidity).

In formulae IV and V,
$R_1$ and $R_2$ denote H, optionally substituted $C_1$–$C_4$-alkyl, $C_6$–$C_{10}$-aryl and $C_1$–$C_3$-alkoxy,
$R_3$ denotes H, optionally substituted $C_1$–$C_4$-alkyl, $C_6$–$C_{10}$-aryl and $C_1$–$C_3$-alkoxy nd halogen,
$R_4$ denotes H, optionally substituted $C_1$–$C_4$-alkyl and $C_1$–$C_3$-alkoxy, CN, halogen, $SO_2R_7$, $COOR_7$, $SO_2OR_7$, $COR_7$, $SO_2NR_7R_8$ and $CONR_7R_8$,
$R_5$ denotes $NHCOR_9$, $NHCOOR_9$, $NHSO_2R_9$ and $NHPO(R_9)_2$,
$R_6$ denotes $CON(R_9)_2$, $NHCOR_9$, $NHCOOR_9$, $NHSO_2R_9$, $NHCON(Rphd\ 9)_2$ and $NHSO_2N(R_9)_2$,
$R_7$ denotes optionally substituted $C_1$–$C_4$-alkyl and $C_6$–$C_{10}$-aryl,
$R_8$ denotes H and $R_7$, $R_7$ and $R_8$ may form a five-membered or six-membered, optionally substituted ring,
$R_9$ denotes H, optionally substituted $C_1$–$C_4$-alkyl, $C_5$–$C_{10}$-cycloalkyl, $C_2$–$C_6$-alkenyl, $C_2$–$C_6$-alkinyl, $C_6$–$C_{10}$-aryl, $C_5$–$C_{10}$-heteroaryl or heteroalkyl and $C_1$–$C_3$-alkoxy, Ballast denotes conventional ballast groups and n stands for 1 or 2.

3 Claims, No Drawings

COLOR PHOTOGRAPHIC RECORDING MATERIAL

This application is a continuation of the copending U.S. application Ser. No. 07/370,452 filed Jun. 23, 1989, now abandoned, by Reinhard Matejec, Hans Langen and Erich Wolff entitled Color Photographic recording Material.

This invention relates to a light-sensitive colour photographic recording material containing a layer support and at least three light-sensitive silver halide emulsion layers, each of a different spectral sensitivity, arranged on said layer support, which silver halide emulsion layers are spectrally associated with, respectively, a cyan coupler, a magenta coupler and a yellow coupler. As a result of the use of special cyan correction dyes corresponding to the formulae of the dyes according to the invention, the stability of the latent image under tropical conditions is improved compared with that of materials containing conventional cyan correction dyes.

BACKGROUND OF THE INVENTION

In the preparation of silver halide emulsions, fluctuations occur which result in differences in minimum densities in the processed colour photographic material. The mass production of copies, however, requires compatible photographic materials. The differing photographic materials can be compared with one another on the basis of the characteristic colour density curves of the three partial colour images. For this purpose, the photographic material is exposed through a grey wedge with a specified intensity of illumination. After colour development, the photographic material on which the step wedge has been copied is measured in a densitometer behind a blue, green or red filter.

The characteristic colour density curves of the individual partial colour images is obtained by plotting the colour density value measurements against the logarithm of exposure. These curves should take a parallel course for neutral colour reproduction. Further, when a neutral object of medium brightness is photographed, the density differences between the yellow and the magenta partial colour image and between the magenta and the cyan partial colour image obtained from different photographic materials should as far as possible be equal if comparable images are to be obtained in the copying process since copying may then be carried out with the same storage adjustment of the print systems so that it becomes unnecessary to select different photographic materials.

The final adjustment of the colour density curves of the individual partial colour images and hence also the density differences between them is carried out with so-called correction dyes chosen according to the charge of the emulsion. In order to obtain optimum image results in the region of over exposure as well as the region of under-exposure and prevent colour casts, the correction dye must be comparable to the dye produced by chromogenic development.

It has been found in practice, however, that the cyan correction dyes conventionally used, which are obtained latent image in storage under tropical conditions (e.g. at 90% relative humidity and 35° C.).

SUMMARY OF THE INVENTION

It was an object of the present invention to develop cyan correction dyes for a colour photographic recording material which would have no adverse effects on the stability of the latent image in storage under tropical conditions.

DETAILED DESCRIPTION

The present invention relates to a colour photographic recording material comprising a layer support and at least three silver halide emulsion layers of different spectral sensitivities arranged on the layer support and spectrally associated with, respectively, a cyan coupler, a magenta coupler and a yellow coupler, characterised in that the colour photographic recording material contains, as cyan correction dyes, azomethine dyes obtained, for example, by the oxidative coupling of p-phenylenediamine derivatives corresponding to the general formula (I)

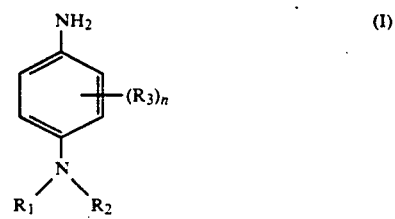

wherein
$R_1$ and $R_2$ denote H and optionally substituted $C_1$-$C_4$-alkyl, $C_6$-$C_{10}$-aryl and $C_1$-$C_3$-alkoxy,
$R_3$ denotes H, optionally substituted $C_1$-$C_4$-alkyl, $C_6$-$C_{10}$-aryl and $C_1$-$C_3$-alkoxy and halogen, and
n stands for 1 or 2
with cyan couplers corresponding to the general formula (II) or (III)

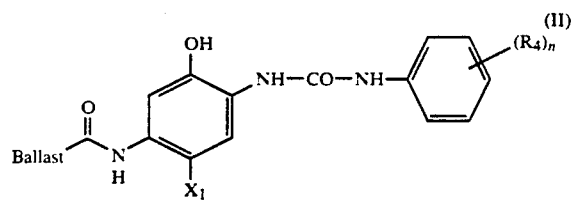

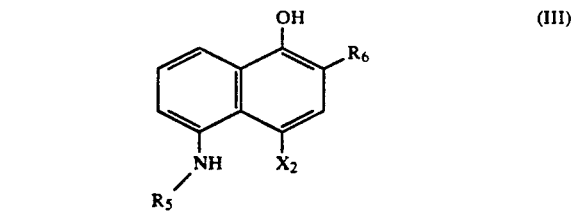

wherein
$R_4$ denotes H, optionally substituted $C_1$-$C_4$-alkyl and $C_1$-$C_3$-alkoxy, CN, halogen, $SO_2R_7$, $COOR_7$, $SO_2OR_7$, $COR_7$, $SO_2NR_7R_8$ and $CONR_7R_8$,
$R_5$ denotes $NHCOR_9$, $NHCOOR_9$, $NHSO_2R_9$ and $NHPO(R_9)_2$,
$R_6$ denotes $CON(R_9)_2$, $NHCOR_9$, $NHCOOR_9$, $NHSO_2R_9$, $NHCON(R_9)_2$ and $NHSO_2N(R_9)_2$,
$R_7$ denotes optionally substituted $C_1$-$C_4$-alkyl and $C_6$-$C_{10}$-aryl,
$R_8$ denotes H and $R_7$ which together with $R_8$ may form a 5-membered or 6-membered, optionally substituted ring,
$R_9$ denotes H, optionally substituted $C_1$-$C_4$-alkyl, $C_2$-$C_6$-alkenyl, $C_2$-$C_6$-alkinyl, $C_6$-$C_{10}$-aryl, $C_5$–$C_{10}$-heteroaryl or heteroalkyl and $C_1$–$C_3$-alkoxy, Ballast denotes conventional ballast groups and $X_1$ and $X_2$ denote H, F, Cl and optionally substituted $C_1$–$C_4$-alkoxy to form dyes corresponding to the general formula (IV) or (V)

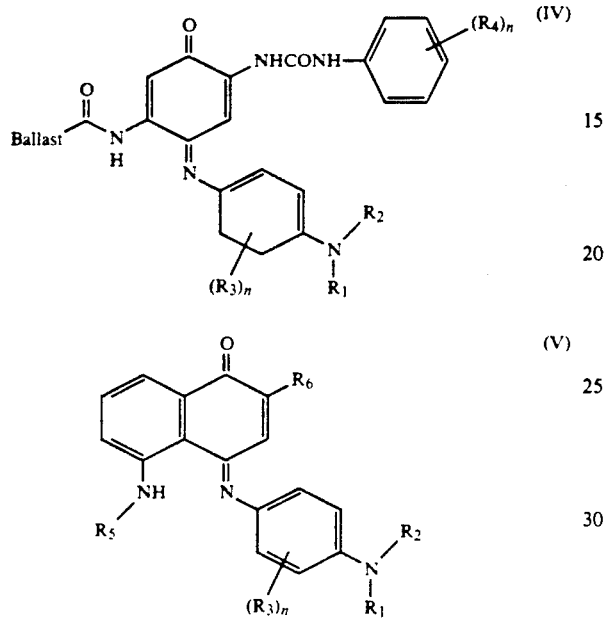

in which the substituents $R_1$ to $R_6$ have the meanings indicated above.

Examples of p-phenylenediamine derivatives corresponding to the general formula (I) are listed below:

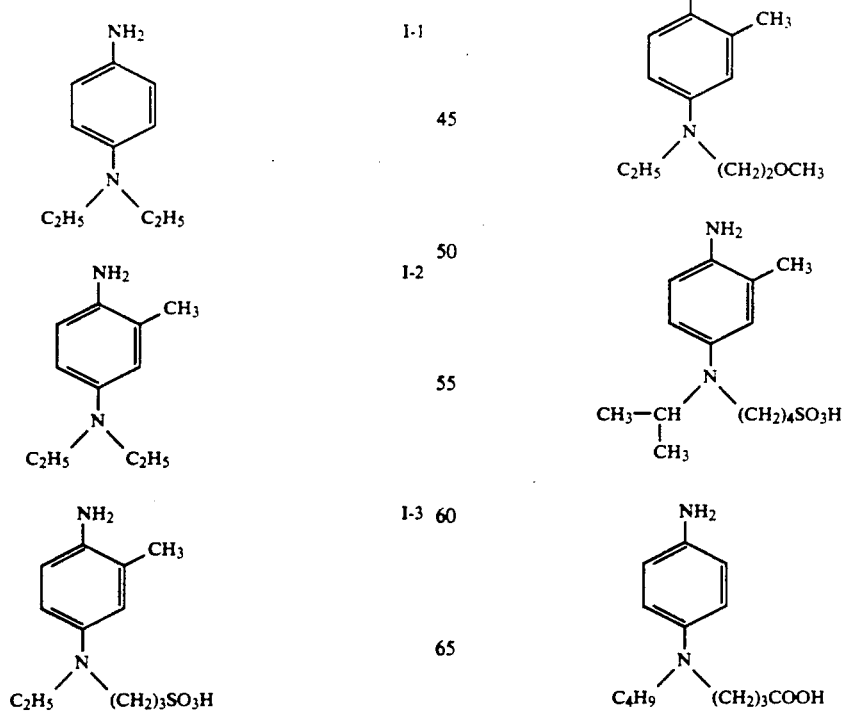

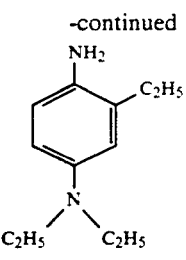

I-4

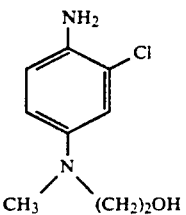

I-5

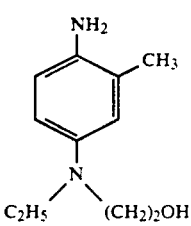

I-6

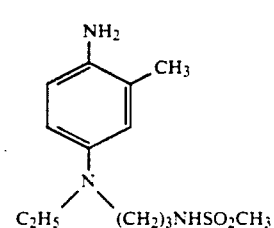

I-7

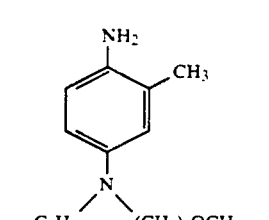

I-8

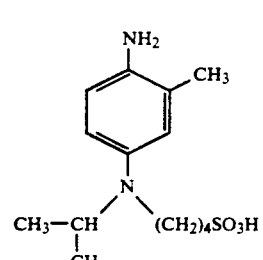

I-9

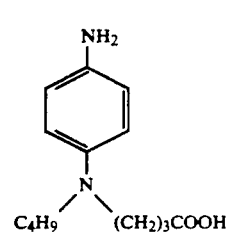

I-10

-continued
I-11
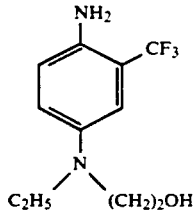
I-12
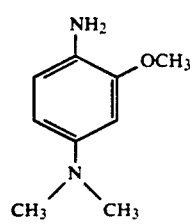
I-13
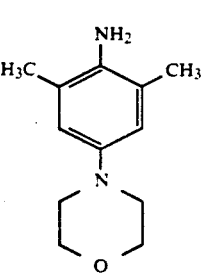
-continued
I-14
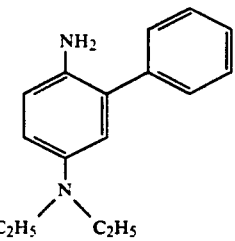
I-15
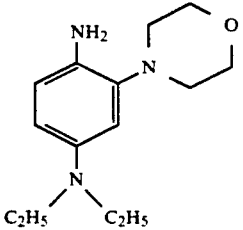
The following compounds are examples of cyan couplers corresponding to formula (II):
II-1
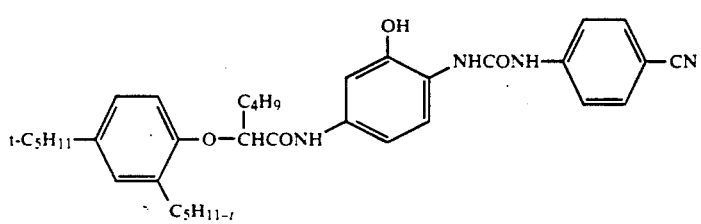
II-2
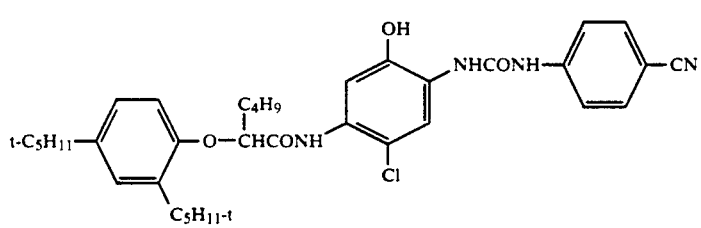
II-3
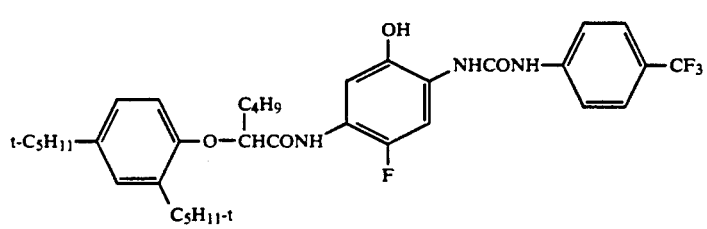
II-4
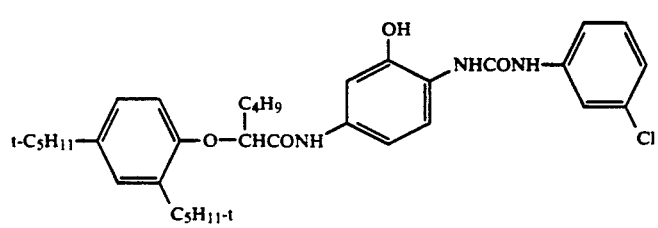

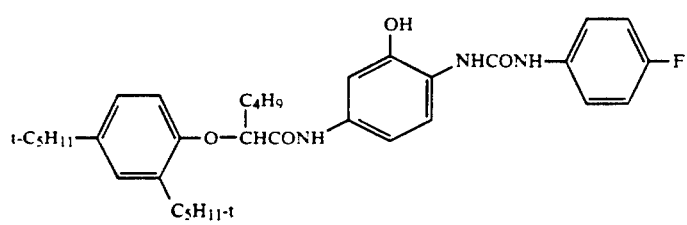
II-5
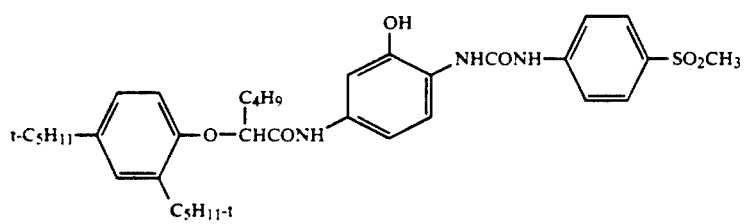
II-6
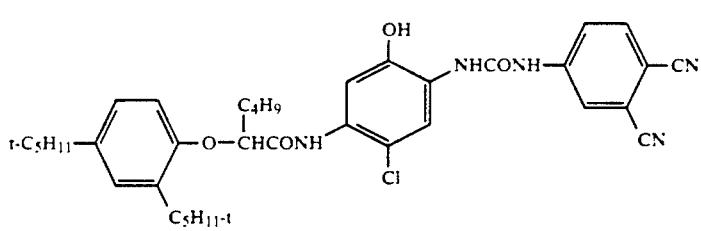
II-7
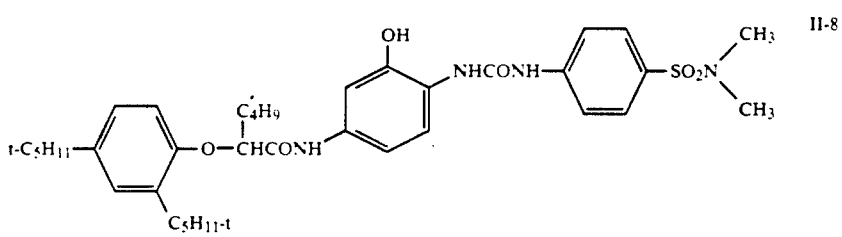
II-8
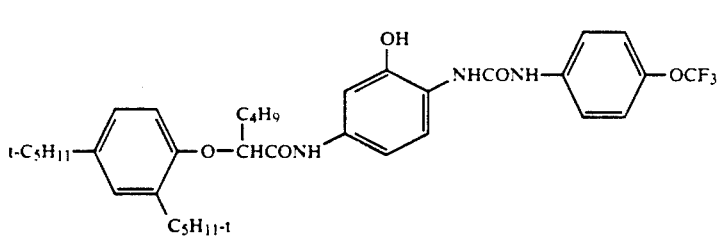
II-9
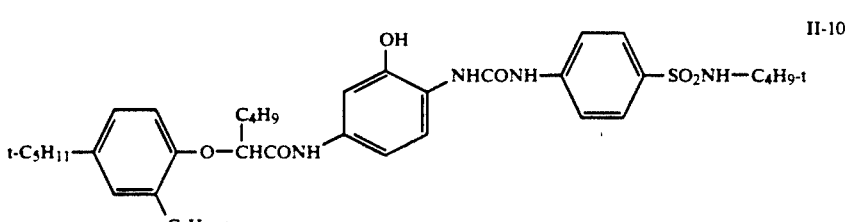
II-10
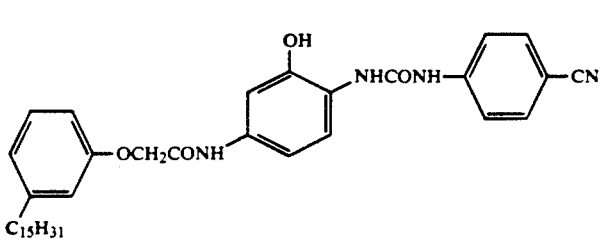
II-11

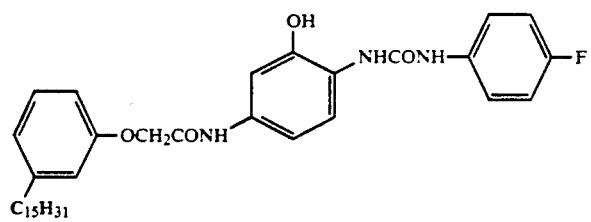
II-12
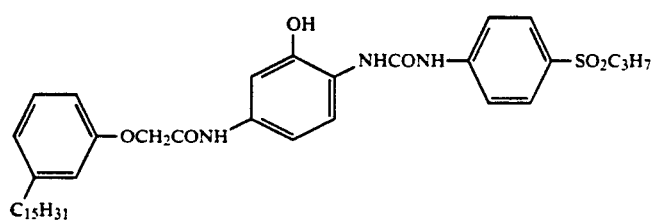
II-13
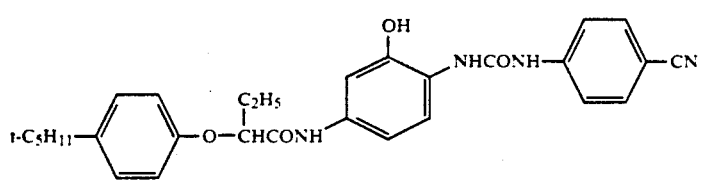
II-14
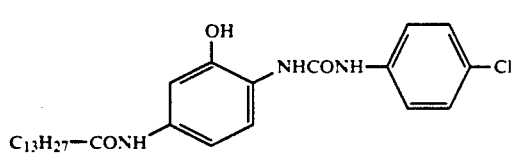
II-15
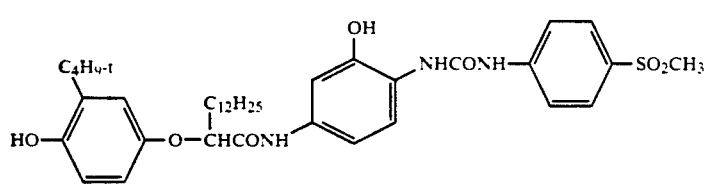
II-16
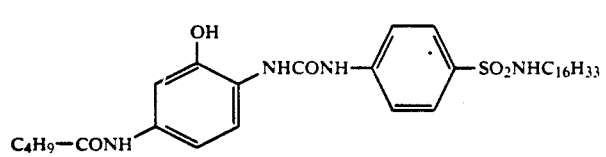
II-17
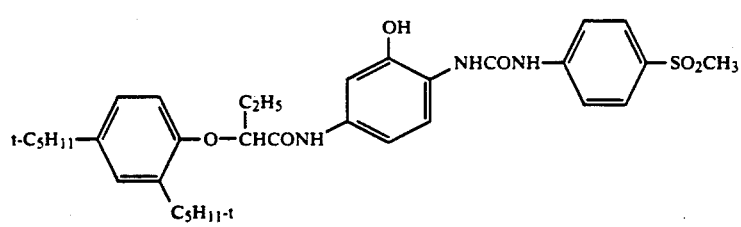
II-18
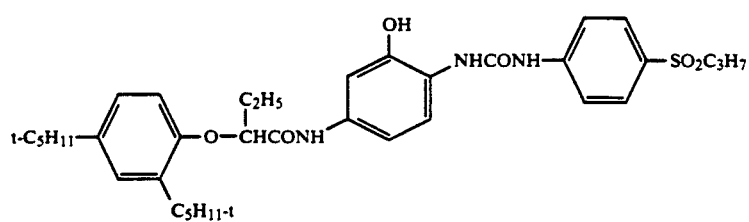
II-19

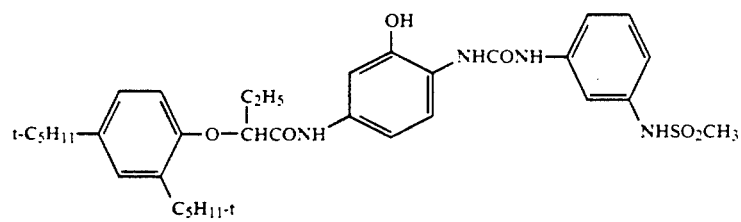
II-20
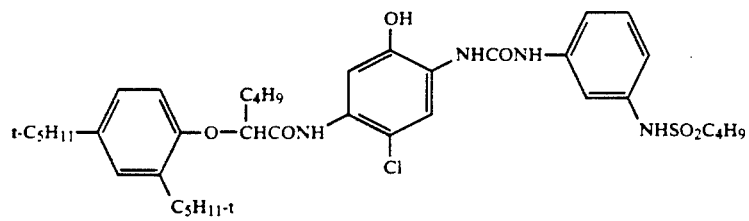
II-21
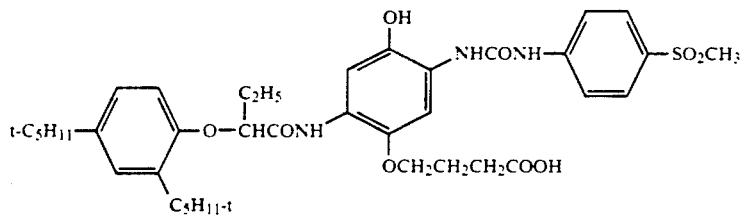
II-22
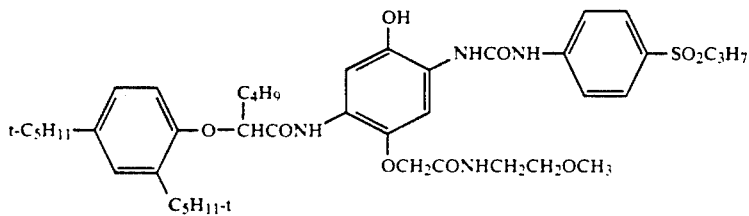
II-23
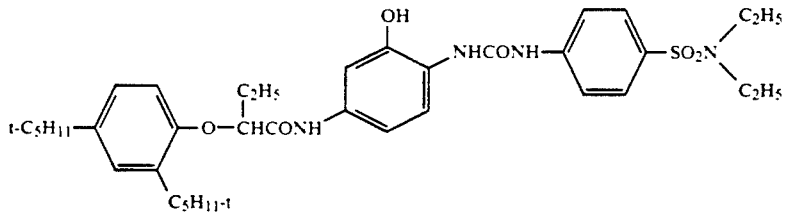
II-24
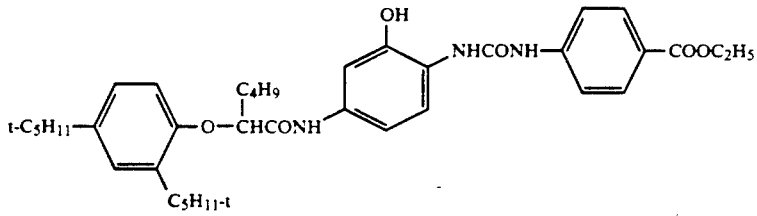
II-25
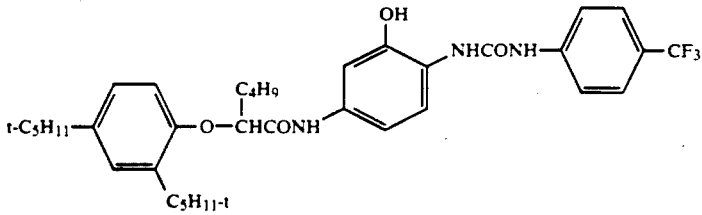
II-26

-continued
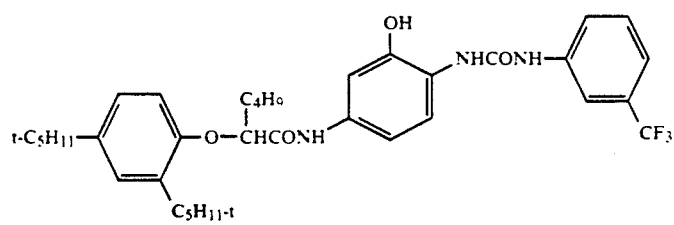
II-27
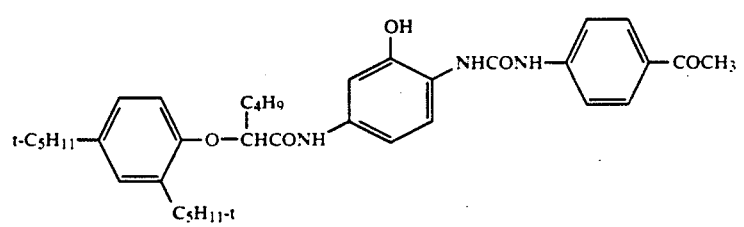
II-28
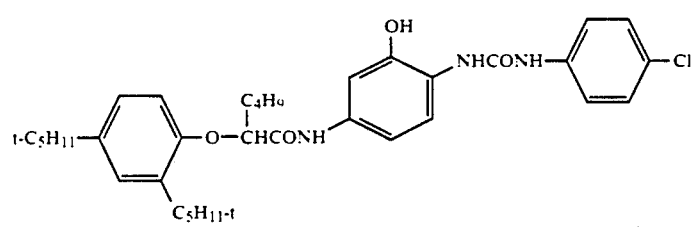
II-29
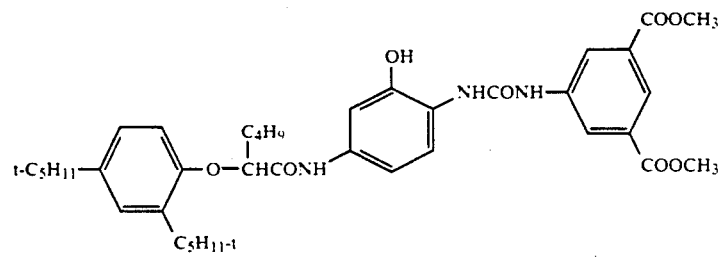
II-30
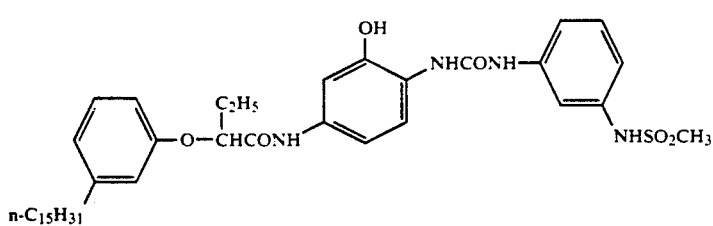
II-31
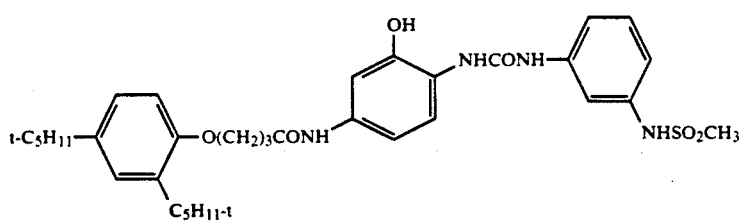
II-32
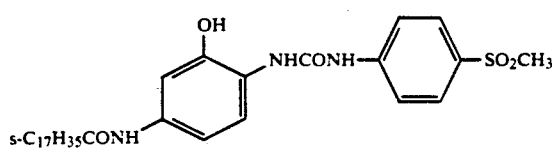
II-33

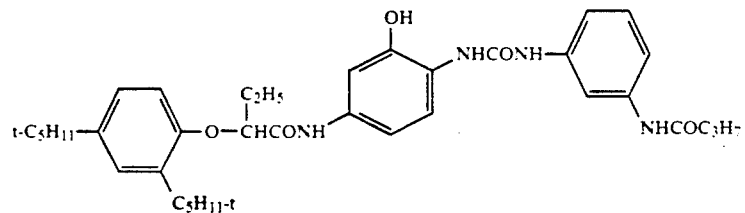
II-34
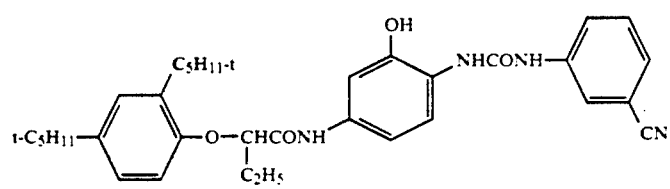
II-35
Couplers having the structure of formula II are described in EP-A-161 626, EP-A-67 689 and DE-OS 33 00 412.
Examples of compounds corresponding to formula (III) are shown below:
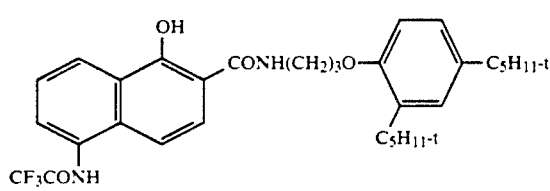
III-1
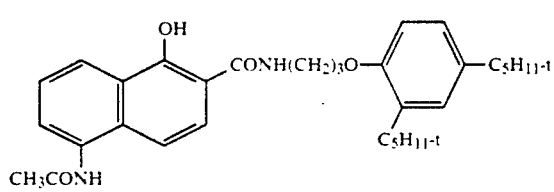
III-2
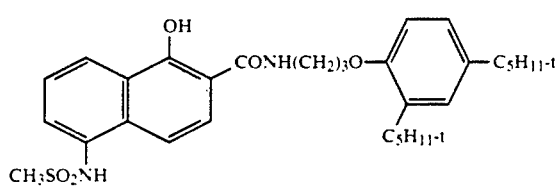
III-3
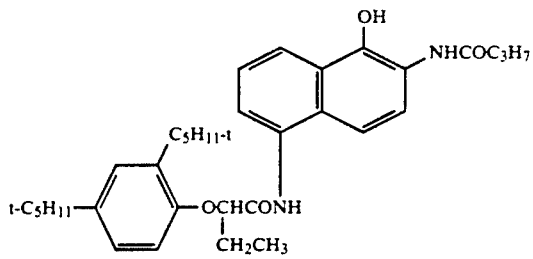
III-4
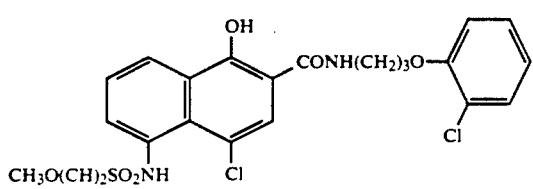
III-5

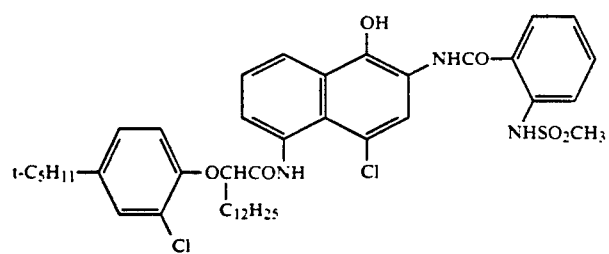
III-6
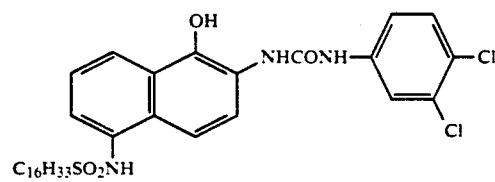
III-7
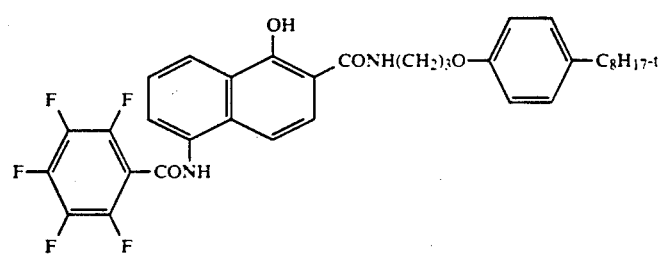
III-8
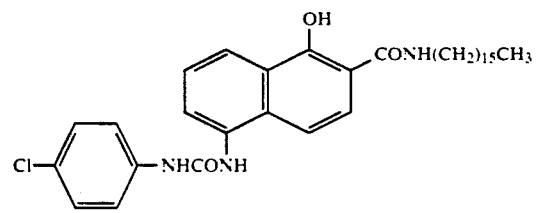
III-9
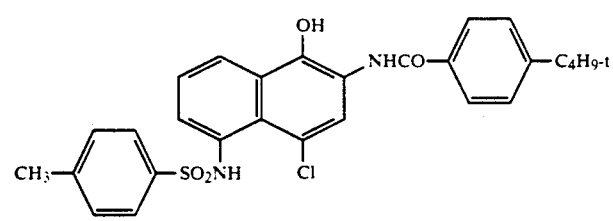
III-10
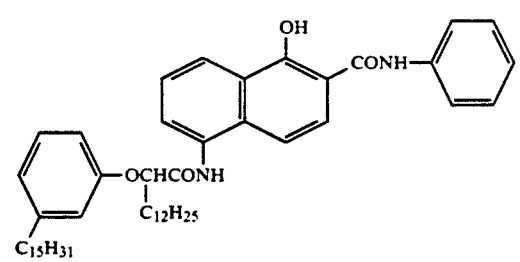
III-11
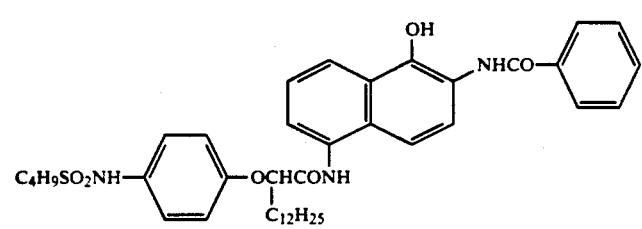
III-12

-continued
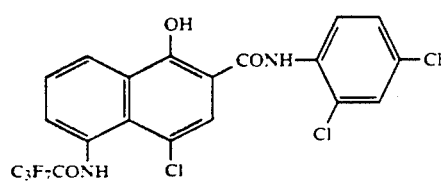 III-13
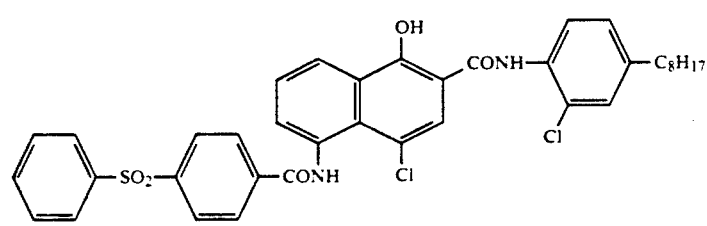 III-14
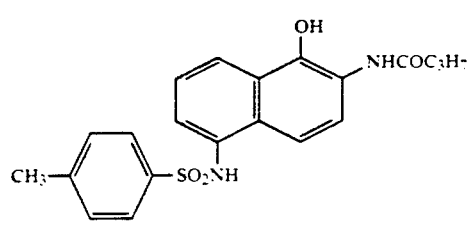 III-15
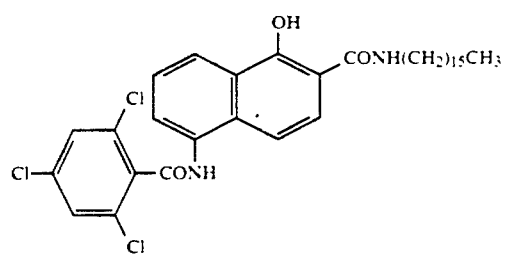 III-16
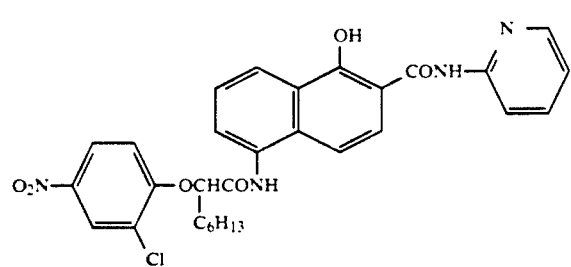 III-17
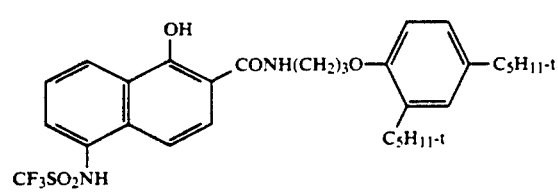 III-18
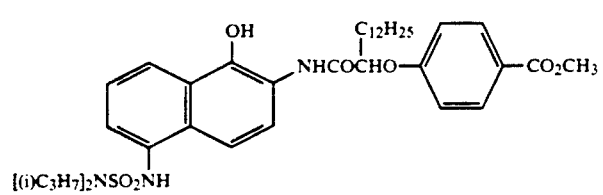 III-19

-continued
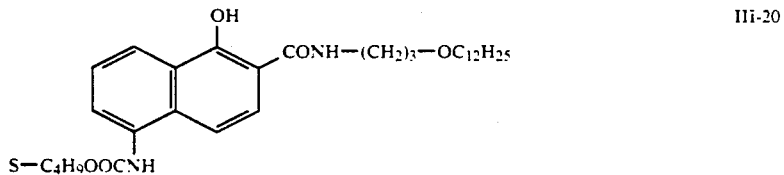 III-20
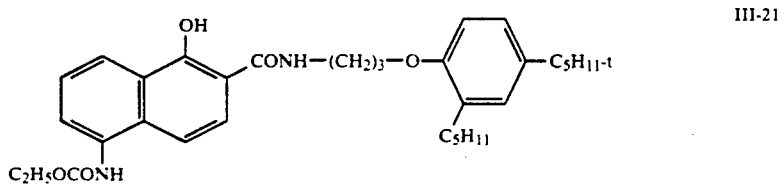 III-21
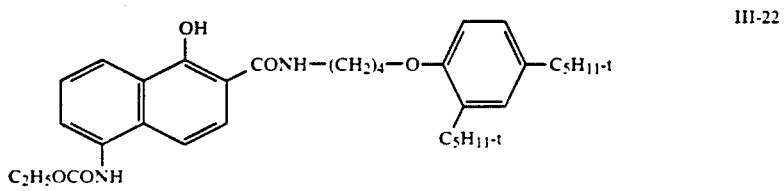 III-22
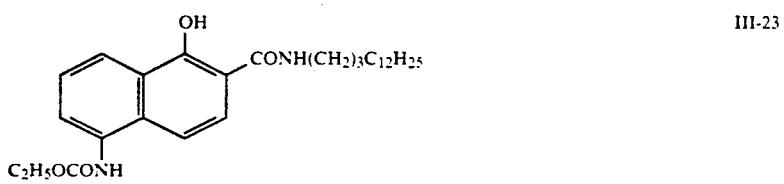 III-23
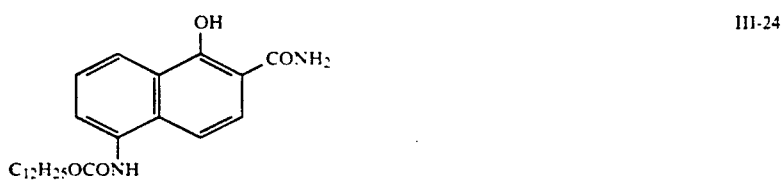 III-24
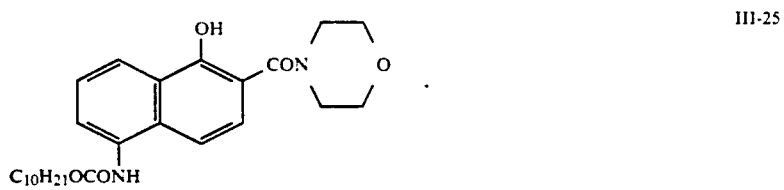 III-25
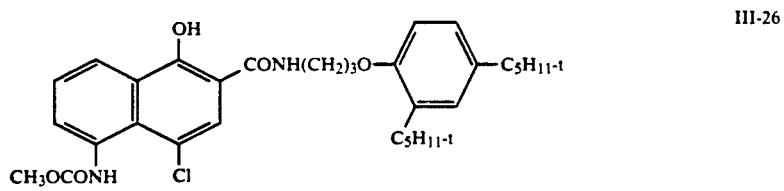 III-26
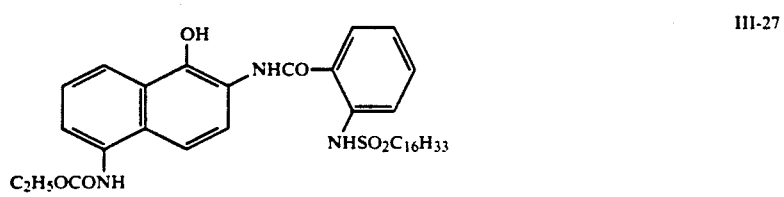 III-27

III-28
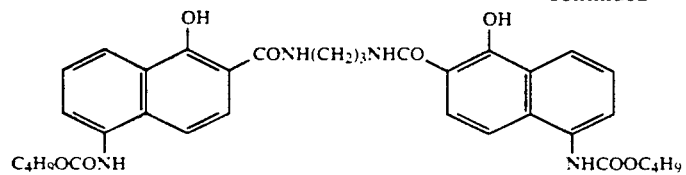
III-29
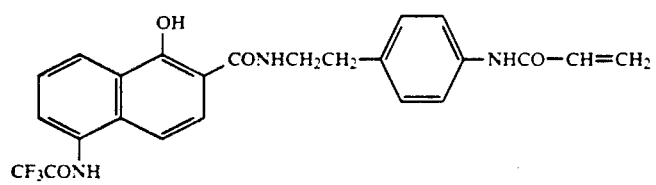
III-30
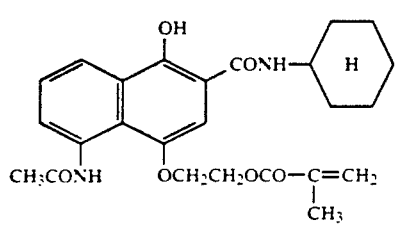
III-31
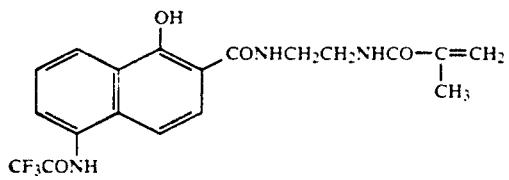
III-32
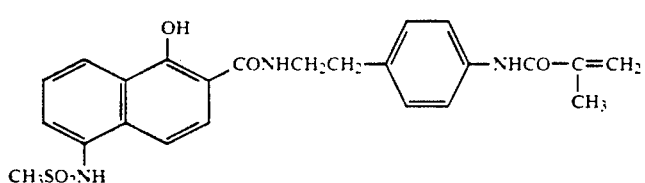
III-33
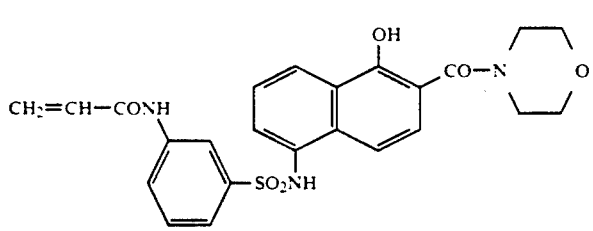
III-34
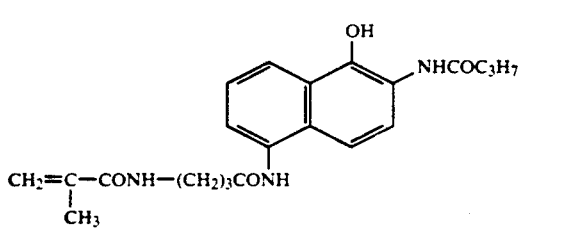
III-35
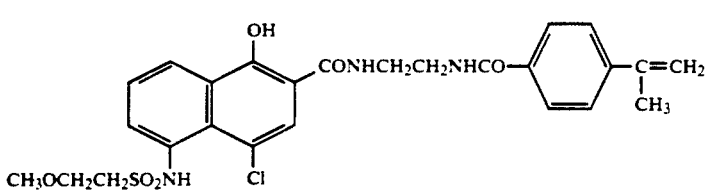

-continued
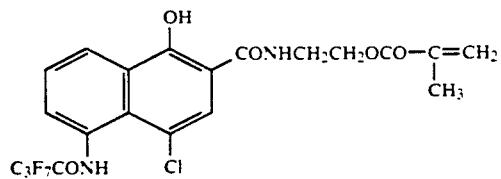 III-36
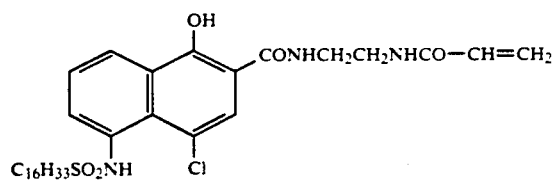 III-37
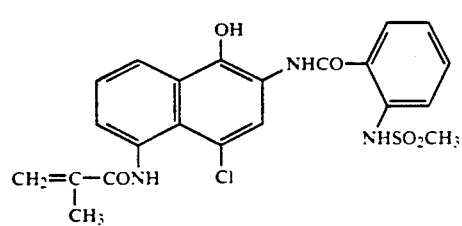 III-38
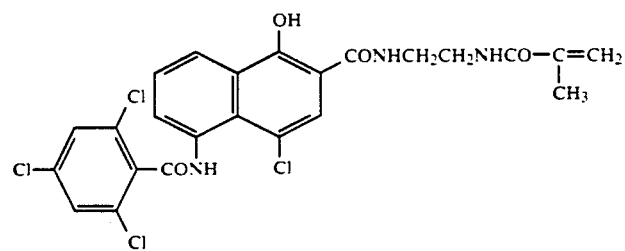 III-39
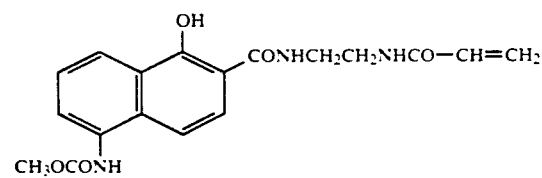 III-40
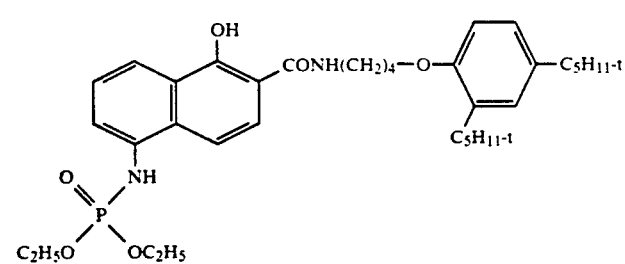 III-41
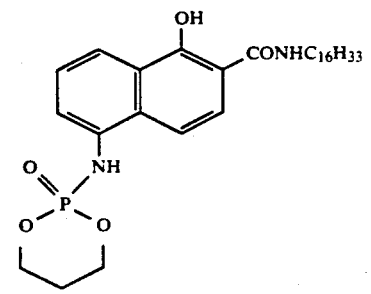 III-42

III-43

[Structure: 1-hydroxy-naphthalene with CONH(CH₂)₃—OC₁₂H₂₅ group and 5-position NH—P(=O)(OC₃H₇)(OC₃H₇)]

III-44

[Structure: 1-hydroxy-naphthalene with CONH(CH₂)₄—O—phenyl(2,4-di-t-C₅H₁₁) group and 5-position NH—P(=O)(OCH₂Ph)(OCH₂Ph)]

The following are examples of ballast groups in formula (IV):

B1: $C_{13}H_{27}-$

B2: [2-t-C₄H₉-4-C₅H₁₁O-phenyl]-O-CH(C₄H₉)-

B3: [2-t-C₄H₉-4-HO-phenyl]-O-CH(C₁₂H₂₅)-

B4: $C_{16}H_{33}-$

B5: [2-t-C₅H₁₁-4-t-C₅H₁₁-phenyl]-O-CH(C₂H₅)-

B6: [succinimide-N-] with C₁₂H₂₅ on ring

B7: $C_{18}H_{37}-S-$

B8: [succinimide-N-]

B9: $C_{15}H_{31}-$

B10: $C_{14}H_{29}-O-$

B11: [succinimide-N-] with C₁₇H₃₅ on ring

B12: [2-t-C₅H₁₁-4-t-C₅H₁₁-phenyl]-O-CH(C₄H₉)-

B-13: [2-t-C₄H₉-4-HO-phenyl]-O-CH(C₆H₁₃)-

B14: $C_{12}H_{25}-O-$

B15: $t\text{-}C_4H_9-$

B16: $C_{17}H_{35}-$

B-18: $(C_4H_9)_2N-$

B19: [3-C₁₅H₃₁-phenyl]-O-CH(C₂H₅)-

The dyes according to the invention may be synthesized not only by the above-mentioned oxidative coupling of p-phenylenediamine derivatives with phenols or napthols but also by the condensation of p-nitroso-N,N-dialylanilines with cyan couplers corresponding to formula (II) or (III) ($X_1, X_2 = H$).

The oxidizing agents used for the first method may be silver salts such as $AgNO_3$, AgCl, AgBr, $Ag_2CO_3$ on cellite, potassium hexacyanoferrate, potassium dichromate, potassium peroxydisulphate, hydrogen peroxide, etc. The product of oxidation of the p-phenylenediamine derivatives reacts with the colour couplers to form the corresponding dyes.

EXAMPLE OF SYNTHESIS 1

Dye F-1 by oxidative coupling of Compound I-6 with Coupler II-1

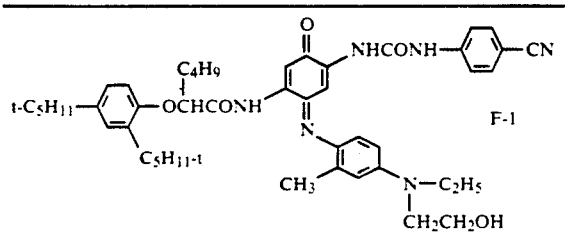

| | |
|---|---|
| 45 g | of II-1 are dissolved with |
| 33 g | of I-6 in |
| 900 ml | of methanol and to this solution are added |
| 90 ml | of sodium methylate solution (30% by weight). A solution of |
| 36 g | of ammonium peroxydisulphate in |
| 90 ml | of water and |
| 180 ml | of methanol is then added. |
| 300 ml | of water are subsequently stirred in and the precipitate is suction filtered, washed and boiled with |
| 500 ml | of methanol. |
| | Yield: 43 g, melting point 220° C. |

EXAMPLE OF SYNTHESIS 2

Dye F-2 by oxidative coupling of Compound I-6 with Coupler III-20

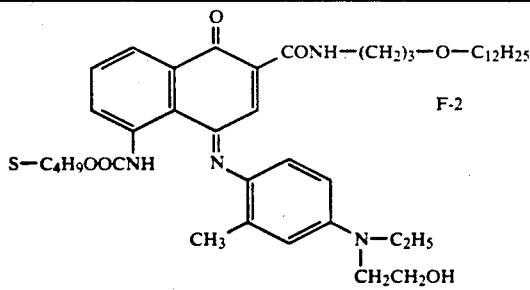

| | |
|---|---|
| 52.8 g | of 5-i-butoxycarbonylamino-1-naphthol-2-carboxylic acid-dodecyl-oxy-poropylamide (III-20) are dissolved together with |
| 31 g | of 2-methyl-4-N-ethyl-N-hydroxyethyl-aniline (I-6) in |
| 900 ml | of methanol and to this solution are added |
| 100 ml | of sodium methylate solution (30% by weight). After the addition of |
| 50 g | of ammonium peroxydisulphate in |
| 120 ml | of water and |
| 240 ml | of methanol, the reaction mixture is stirred for 15 minutes and the dye is then precipitated by stirring the reaction mixture into |
| 3 l | of ice water. |

-continued

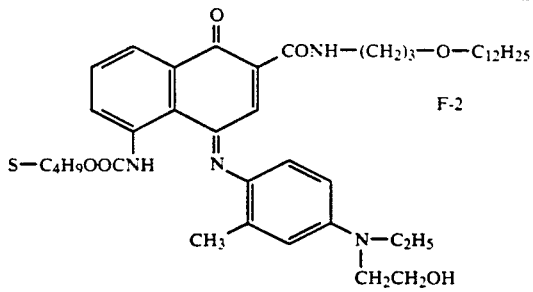

| |
|---|
| The crude product is purified by column chromatography on silica gel using ethyl acetate/methylene chloride (1:1) as solvent. Yield: 58 g, m.p.: 168° C. |

The dyes corresponding to the general formulae (IV) and (V) are distinguished by a suitable longwave absorption in the red spectral region between 650 and 730 nm as well as by narrow half band widths and low side densities in the green spectral region.

The main advantage of the above-mentioned azomethine dyes, however, is their surprising property that they are not capable of destroying latent image nuclei by oxidation. No destruction of the latent image occurs even under tropical conditions at temperatures of 35° C. and 90% relative humidity.

The correction dyes may be emulsified by, for example, the following method:

100 g of the dye were dissolved in a mixture of 300 ml of ethyl acetate and 200 ml of tetrahydrofuran and to this solution were added 100 g of tricresylphosphate and 100 g of diethyllauramide. After adjustment of the temperature to 50° C., the mixture was emulsified in 2 kg of 5% gelatine which had been heated to 50° C. and to which 10 g of dodecylbenzene sulphonic acid sodium had been added. This emulsification was carried out with a high pressure homogenizer, Model 15 M-8TA with two-stage homogenizing valve manufactured by Manton-Goulin S.A. The readily volatile solvent was subsequently evaporated off under vacuum and the dispersion left behind solidified at 8° C.

The supports used for the preparation of the colour photographic materials may be, for example, films and sheets of semisynthetic and synthetic polymers such as cellulose nitrate, cellulose acetate, cellulose butyrate, polystyrene, polyvinyl chloride, polyethylene terephthalate and polycarbonate as well as paper laminated with a baryta layer or a layer of α-olefine polymer (e.g. polyethylene). These supports may be coloured with dyes and pigments, e.g. titanium dioxide. They may also be coloured black as protective against the light. The surface of the support is generally subjected to a treatment to improve the adherence of the photographic emulsion layer, for example a corona discharge followed by application of a substrate layer.

The colour photographic materials normally contain at least one red-sensitive, at least one green-sensitive and at least one blue-sensitive silver halide emulsion layer and optionally also interlayers and protective layers. Preferably, the cyan correction dyes according to the invention are incorporated in a layer which is arranged closer to the support than any light-sensitive layer.

The main components of the photographic emulsion layers are binders, silver halide grains and colour couplers.

The binder used is preferably gelatine but this may be partly or completely replaced by other synthetic, semi-synthetic or naturally occurring polymers. Examples of synthetic gelatine substitutes are polyvinyl alcohol, poly-N-vinylpyrrolidone, polyacrylamides, polyacrylic acid and derivatives thereof, especially copolymers thereof. Naturally occurring gelatine substitutes include, for example, other proteins such as albumin or casein, cellulose, sugar, starch and alginates. Semisynthetic gelatine substitutes are generally modified naturally occurring products. Cellulose derivatives such as hydroxyalkylcellulose, carboxymethylcellulose and phthalyl cellulose as well as gelatine derivatives obtained by a reaction with alkylating or acylating agents or by the grafting of polymerisable monomers are examples of these.

The binders should contain a sufficient quantity of functional groups to produce sufficiently resistant layers by their reaction with suitable hardeners. The functional groups are mainly amino groups but also carboxyl groups, hydroxyl groups and active methylene groups.

Gelatine, which is the binder preferably used, may be obtained by acid or by alkaline decomposition. Oxidized gelatine may also be used. The preparation of such gelatines is described, for example, in "The Science and Technology of Gelatine", published by A. G. Ward and A. Courts, Academic Press 1977, pages 295 et seq. The gelatine should be as free as possible from photographically active impurities (inert gelatine). Gelatines which have a high viscosity and low swelling are particularly advantageous.

The silver halide present as the light-sensitive component of the photographic material may be composed of chloride, bromide or iodide or mixtures thereof. The halide content of at least one layer may consist, for example, of 0 to 15 mol-% of iodide, 0 to 100 mol-% of chloride and 0 to 100 mol-% of bromide. The halides may consist of predominantly compact crystals, e.g. in the form of regular cubes or octahedrons or transitional forms but platelet shaped crystals having an average ratio of diameter to thickness of preferably at least 5:1 are advantageously also present, the diameter of a grain being defined as the diameter of a circle having a surface area equal to the projected surface area of the grain. The layers may also contain tabular silver halide crystals, in which the ratio of diameter to thickness is substantially greater than 5:1, e.g. from 12:1 to 30:1.

The silver halide grains may also have a multilayered grain structure consisting, in the simplest case, of an inner grain region and an outer grain region (core/shell) which differ from one another in their halide composition and/or other modifications such as doping. The average grain size of the emulsions is preferably from 0.2 μm to 2.0 μm and the grain size distribution may be either homodisperse or heterodisperse. A homodisperse grain size distribution means that 95% of the grains deviate from the average grain size by not more than ±30%. The emulsions may also be in the form of mixtures of several homodisperse emulsions and mixtures of homodisperse and/or heterodisperse emulsions. The emulsions may contain organic silver salts in addition to the silver halide, e.g. silver benzotriazolate or silver behenate.

Two or more types of silver halide emulsions which have been prepared separately may be used as a mixture.

The photographic emulsions may be prepared from soluble silver salts and soluble halides by various methods (e.g. P. Glafkides, Chimie et Physique Photographique, Paul Montel, Paris (1967), G. F. Duffin, Photographic Emulsion Chemistry, The Focal Press, London (1966), V. L. Zelikman et al, Making and Coating Photographic Emulsions, The Focal Press, London (1966).

Precipitation of the silver halide is preferably carried out in the presence of the binder, e.g. gelatine, and may be carried out at an acid, neutral or alkaline pH, preferably with the additional use of silver halide complex formers such as, for example, ammonia, thioethers, imidazole, ammonium thiocyanate or excess halide. The water-soluble silver salts and the halides may be brought together either successively by the single jet process or simultaneously by the double jet process or by any combination of the two processes. They are preferably introduced at increasing inflow rates but the "critical" inflow rate at which fresh nuclei just fail to be produced should not be exceeded. The pAg range may vary within wide limits during precipitation which, however, is preferably carried out by the so-called pAg controlled process in which the pAg is either kept constant at a particular value or made to pass through a predetermined profile during precipitation. Precipitation may be carried out under the preferred condition of a halide excess but may also be carried out as a so-called inverse precipitation with an excess of silver ions. The silver halide crystals may be made to grow not only by precipitation but also by physical ripening (Ostwald ripening) in the presence of excess halide and/or silver halide complex formers. Growth of the emulsion grains may in fact take place predominantly by Ostwald ripening, in which case a fine grained, so-called Lippmann emulsion is advantageously mixed with a more sparingly soluble emulsion and dissolved and reprecipitated on the latter.

Salts or complexes of metals such as Cd, Zn, Pb, Tl, Bi, Ir, Rh or Fe may be present during the precipitation and/or physical ripening of the silver halide grains.

Precipitation may also be carried out in the presence of sensitizing dyes. Complex formers and/or dyes may be rendered inactive at any stage, e.g. by alteration of the pH or by an oxidative treatment.

After crystal formation has been terminated or at an earlier stage, the soluble salts are removed from the emulsion, e.g. by shredding and washing, by flocculation and washing, by ultrafiltration or by means of ion exchangers.

The silver halide emulsion is generally subjected to a chemical sensitization under specified conditions of pH, pAg, temperature and concentration of gelatine, silver halide and sensitizer until the optimum sensitivity and fogging is reached. The procedure has been described e.g. by H. Frieser in "Die Grundlagen der Photographischen Prozesse mit Silverhalogeniden", pages 675–734, published by Akademische Verlagsgesellschaft (1968).

Chemical sensitization may be carried out with the addition of compounds of sulphur, selenium or tellurium and/or compounds of metals of sub-Groups I and-/or VIII of the Periodic System (e.g. gold, platinum, palladium or iridium). Thiocyanate compounds, surface-active compounds such as thioethers, heterocyclic nitrogen compounds (e.g. imidazoles, azaindenes) and spectral sensitizers (described e.g. by F. Hamer in "The Cyanine Dyes and Related Compounds", 1964, and Ullmanns Encyclopädie der technischen Chemie, 4th Edition, Vol. 18, pages 431 et seq and Research Disclosure No. 17643, Section III) may also be added. In addition to or instead of this form of chemical sensitization, a reduction sensitization may be carried out with the addition of reducing agents (tin-II salts, amines, hydrazine derivative, aminoboranes, silanes, formamidine sulphinic acid), by means of hydrogen or a low pAg (e.g. below 5) and/or by means of a high pH (e.g. above 8).

The photographic emulsions may contain compounds to prevent fogging or to stabilize the photographic function during production, storage or photographic processing.

Azaindenes are particular suitable, especially tetra- and pentaazaindenes and more particularly those which are substituted with hydroxyl or amino groups. Compounds of this type are described, e.g. by Birr, Z. Wiss. Phot. 47, (1952), pages 2 to 58. Salts of metals such as mercury or cadmium, aromatic sulphonic or sulphinic acids such as benzene sulphinic acid, nitrogen-containing heterocyclic compounds such as nitrobenzimidazole or nitroindazole and optionally substituted benzortriazoles or benzothiazolium salts may also be used as anti-foggants. Heterocyclic compounds containing mercapto groups are particularly suitable. e.g. mercaptobenzothiazoles, mercaptobenzimidazoles, mercaptotetrazoles, mercaptothiadiazoles or mercaptopyrimidines. These mercaptoazoles may also contain a water solubilizing group, e.g. a carboxyl group or a sulpho group. Other suitable compounds are published in Research Disclosure No. 17643 (1978), Section VI.

The stabilizers may be added to the silver halide emulsions before, during or after their ripening. The compounds may, of course, also be added to other photographic layers associated with a silver halide layer.

Mixtures of two or more of the above-mentioned compounds may be used.

The photographic emulsion layers or other hydrophilic colloid layers of the light-sensitive material prepared according to the invention may contain surface-active agents for various purposes, e.g. coating auxiliaries or additives to prevent electric charging, to improve the slip properties, to emulsify the dispersion, to prevent adhesion and to improve the photographic characteristics (e.g. development acceleration, high contrast, sensitization, etc.). In addition to naturally occurring surface-active compounds such as saponin, synthetic surface-active compounds (surface-active agents) are mainly used. These include non-ionic surface-active agents such as alkylene oxide compounds, glycerol compounds or glycidol compounds; cationic surface-active agents such as higher alkylamines, quaternary ammonium salts, pyridine compounds and other heterocyclic compounds, sulphonium compounds and phosphonium compounds; anionic surface-active agents containing an acid group such as a carboxylic acid, sulphonic acid, phosphoric acid, sulphuric acid ester or phosphoric acid ester group; ampholytic surface-active agents such as amino acid compounds and amino sulphonic acid compounds and sulphuric or phosphoric acid esters of amino alcohol.

The photographic emulsions may be spectrally sensitized with methine dyes or other dyes. Cyanine dyes, merocyanine dyes and complex merocyanine dyes are particularly suitable for this purpose.

Sensitizers may be omitted if the intrinsic sensitivity of the silver halide is sufficient for a particular spectral region, as, for example, the blue sensitivity of silver bromides.

Non-diffusible monomeric or polymeric colour couplers are associated with the emulsion layers of different sensitivities. These couplers may be contained in the same layer or in an adjacent layer. Cyan couplers are generally associated with the red-sensitive layers, magenta couplers with the green-sensitive layers and yellow couplers with the blue-sensitive layers.

The colour couplers for producing the cyan partial colour image are generally couplers of the phenol or α-naphthol series. The following are suitable examples:

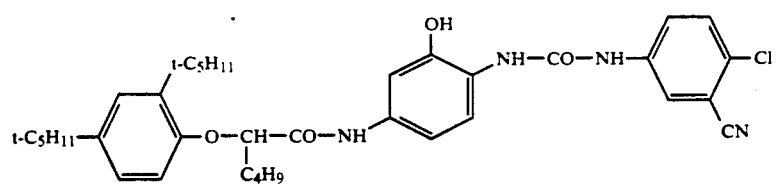

BG 1

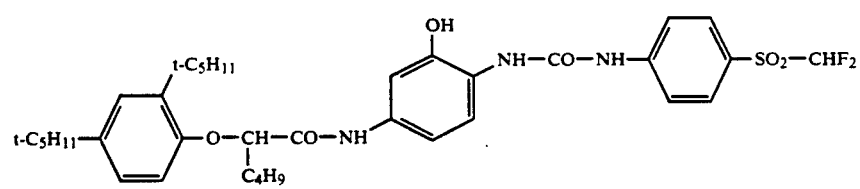

BG 2

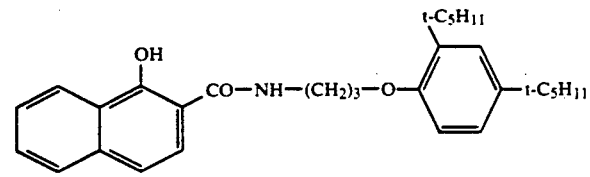

BG 3

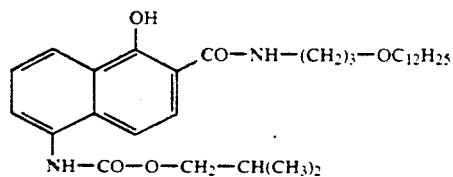 BG 4
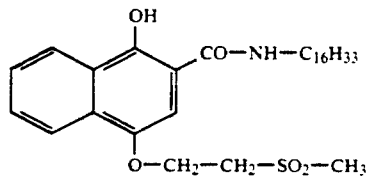 BG 5
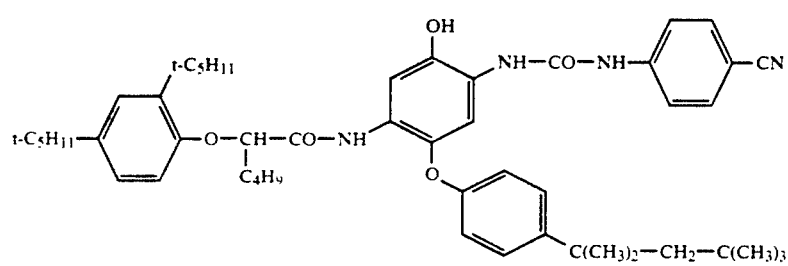 BG 6
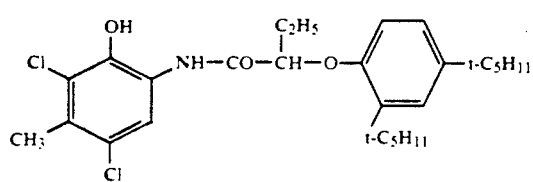 BG 7
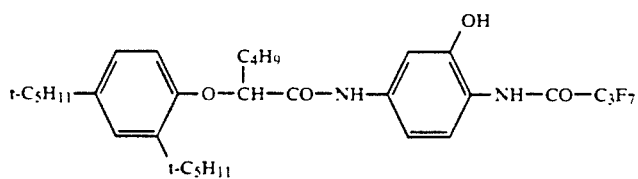 BG 8
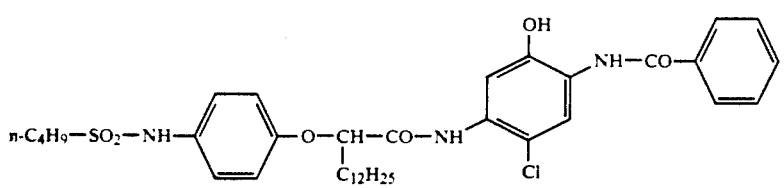 BG 9
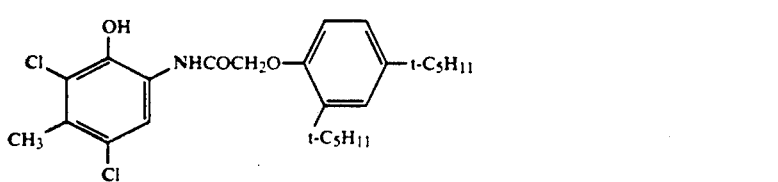 BG 10
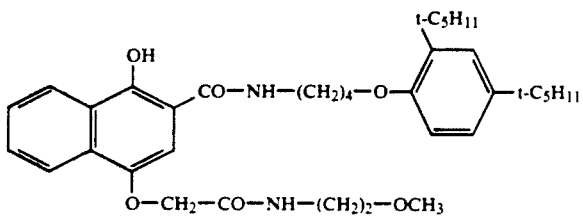 BG 11

-continued
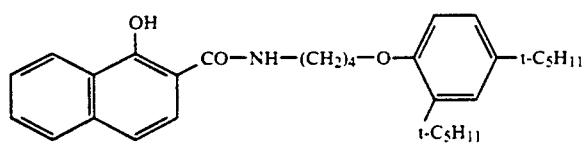
BG 12
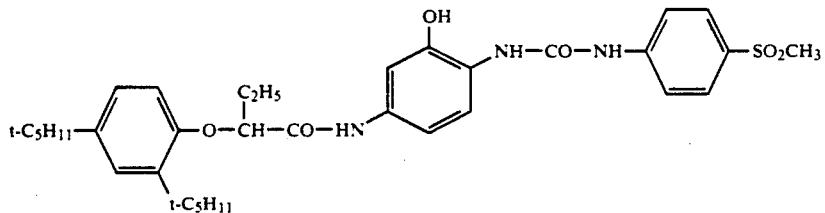
BG 13
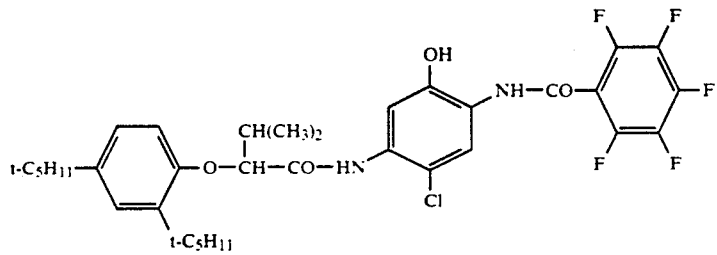
BG 14
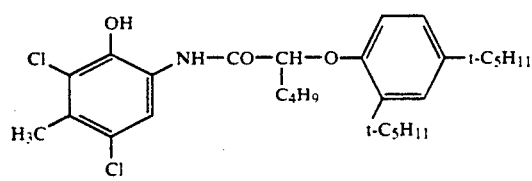
BG 15
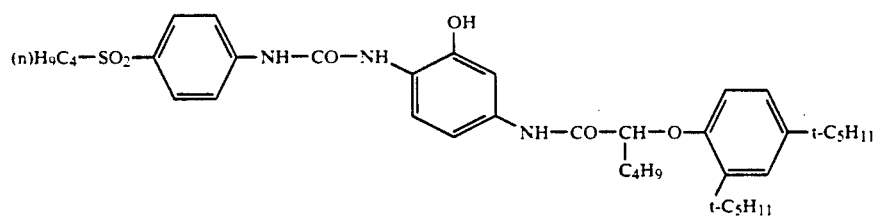
BG 16
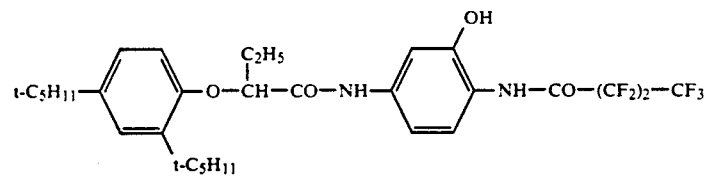
BG 17
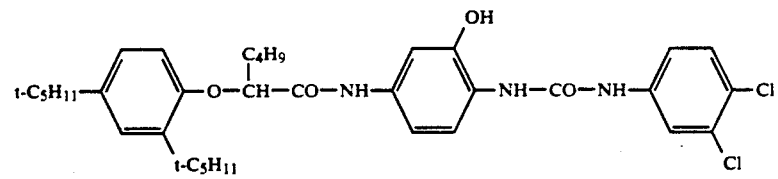
BG 18
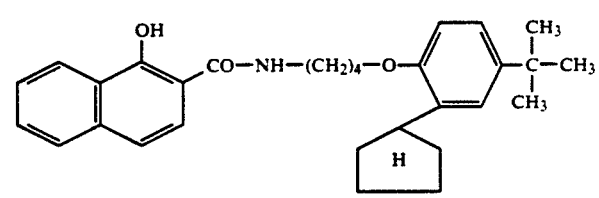
BG 19

-continued
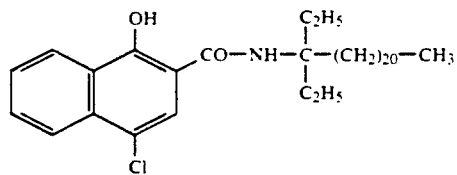 BG 20
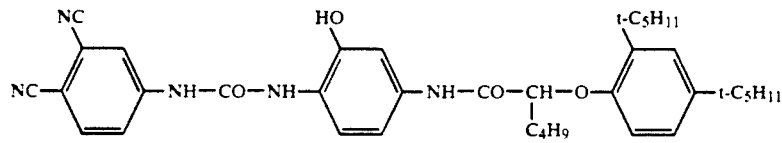 BG 21
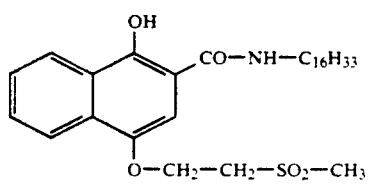 BG 22
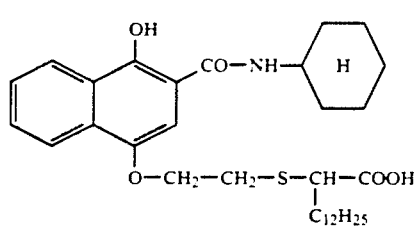 BG 23
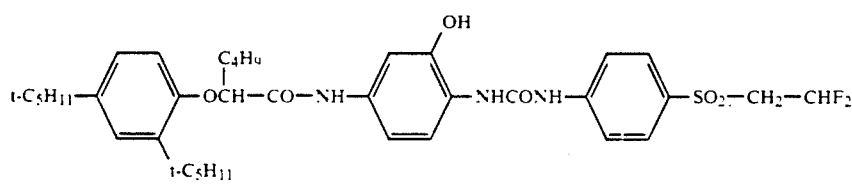 BG 24
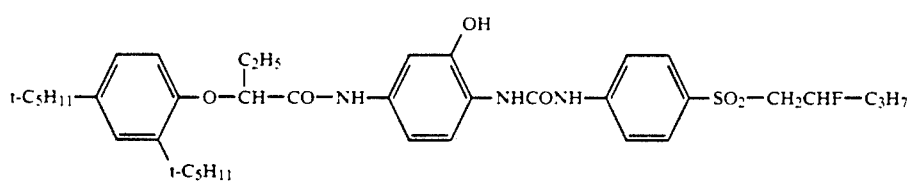 BG 25
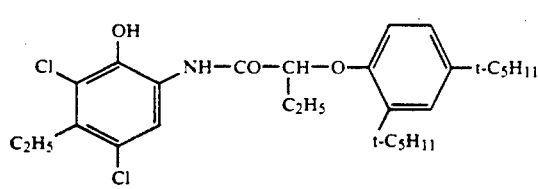 BG 26
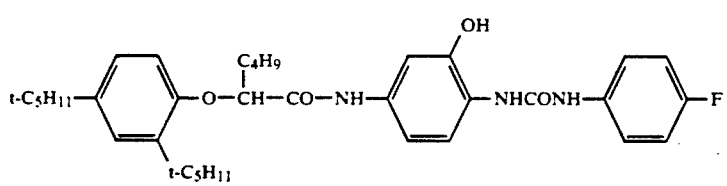 BG 27
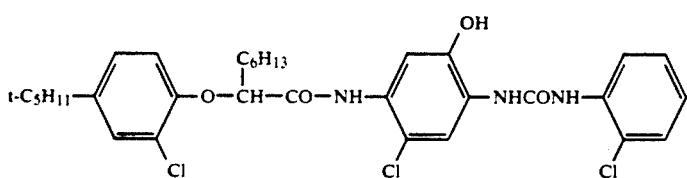 BG 28

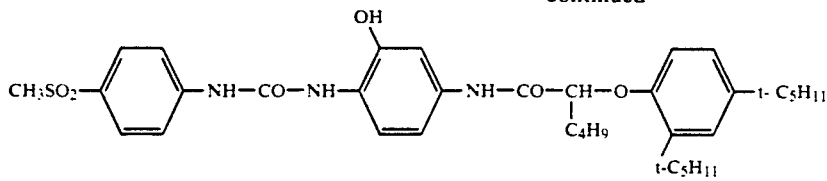
BG 29
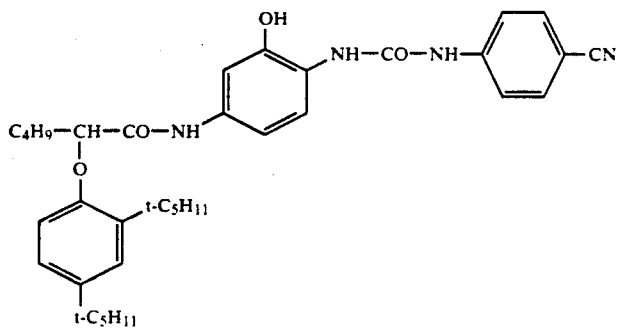
BG 30
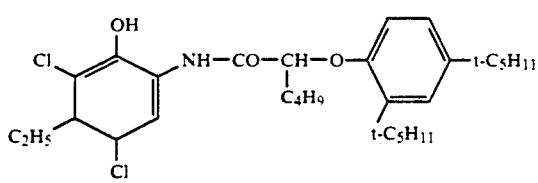
BG 31
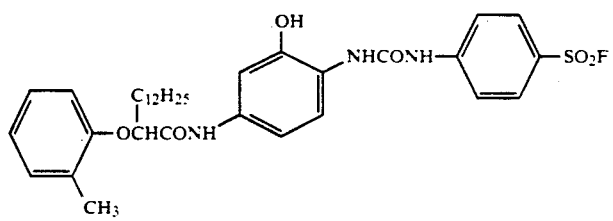
BG 32
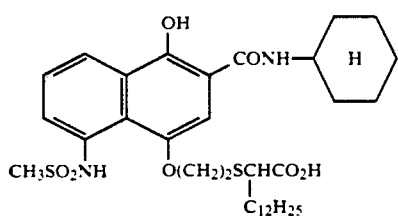
BG 33
Colour couplers for producing the magenta partial colour image are generally couplers of the 5-pyrazolone series, the indazolone or the pyrazoloazole series. The following are suitable examples:
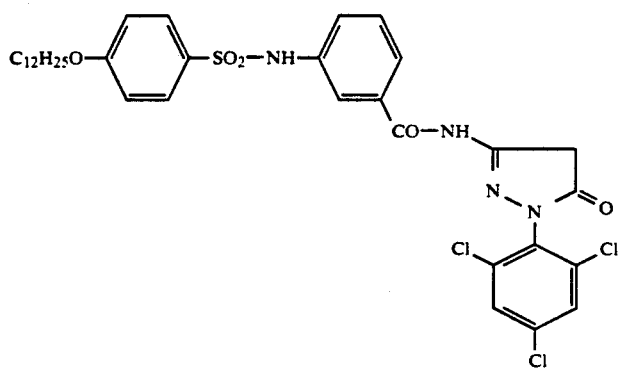
PP 1

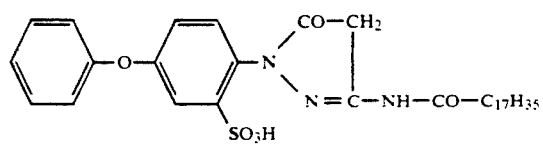
PP 2
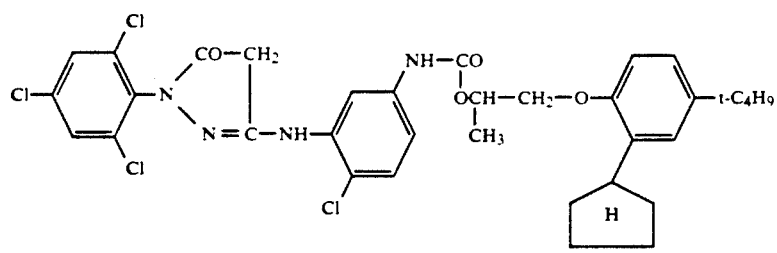
PP 3
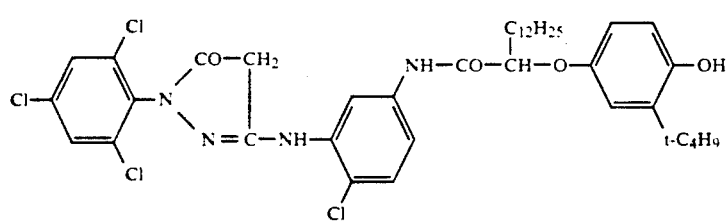
PP 4
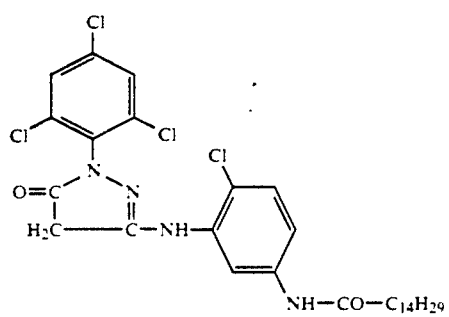
PP 5
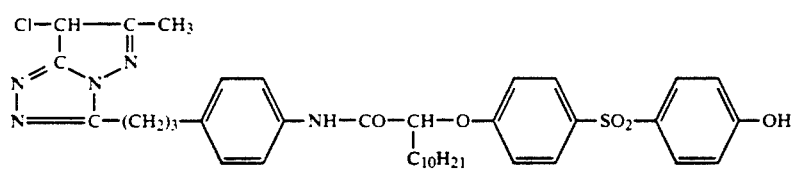
PP 6
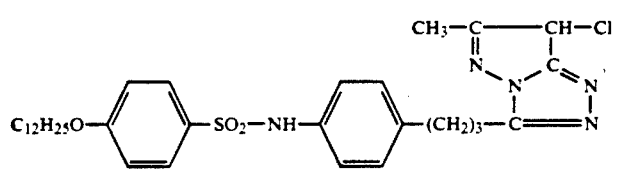
PP 7
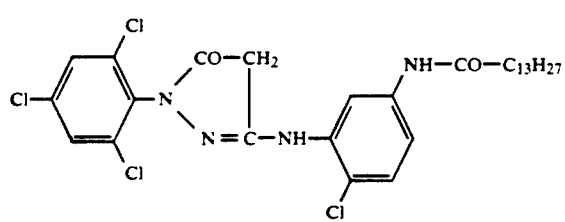
PP 8

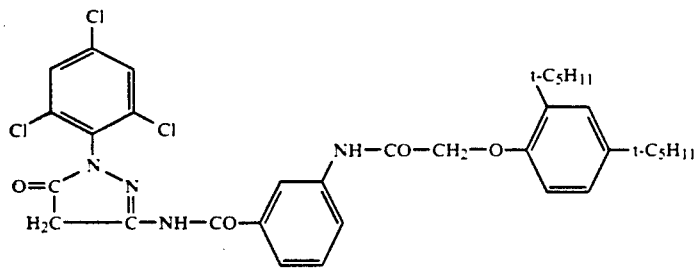
PP 9
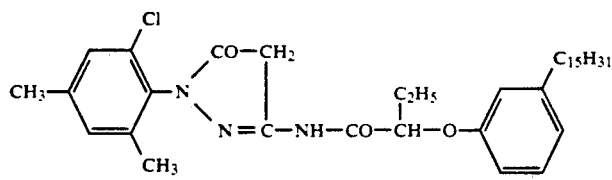
PP 10
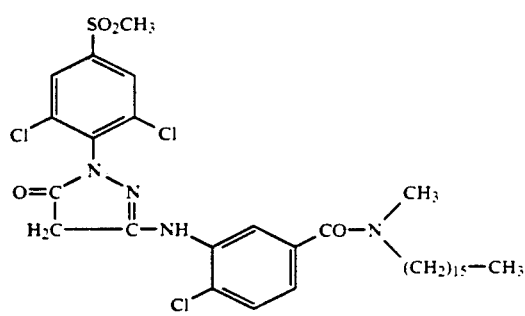
PP 11
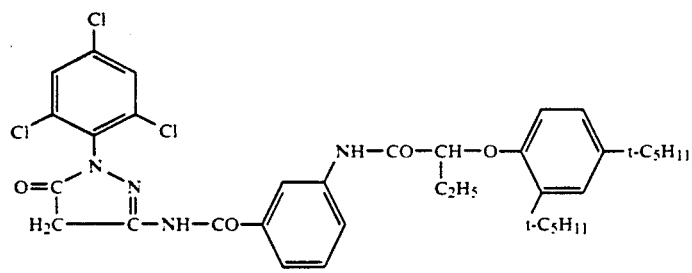
PP 12
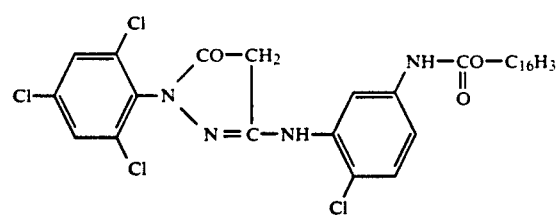
PP 13
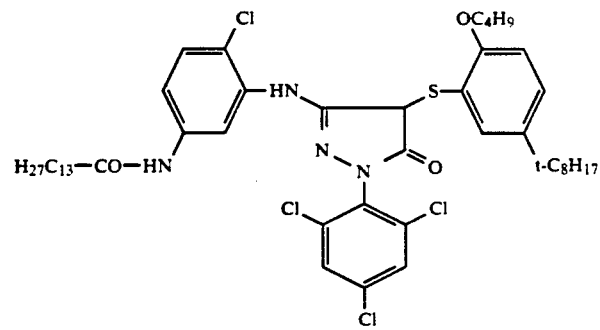
PP 14

-continued
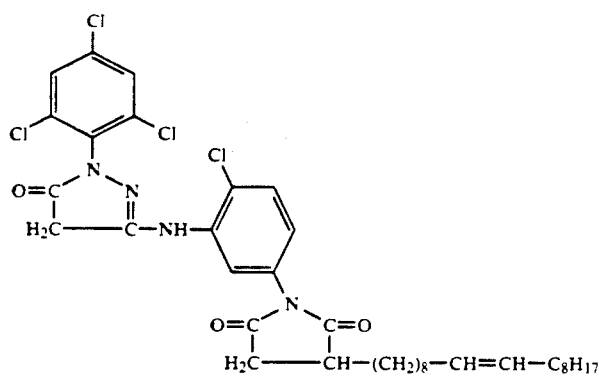
PP 15
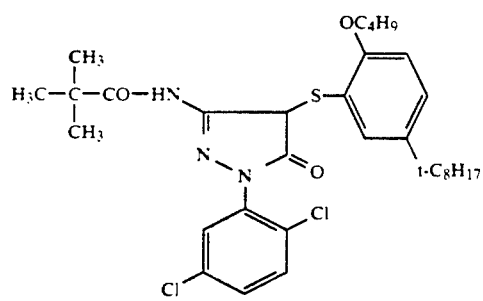
PP 16
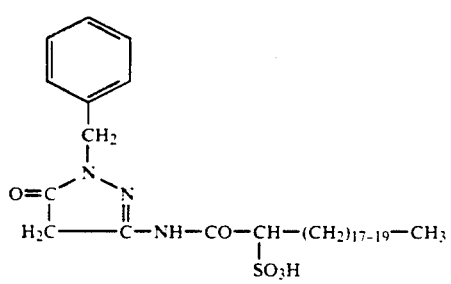
PP 17
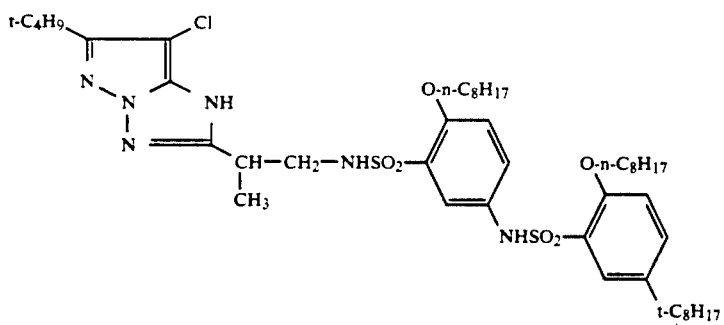
PP 18
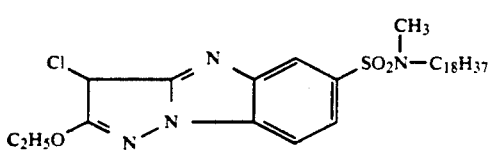
PP 19

-continued

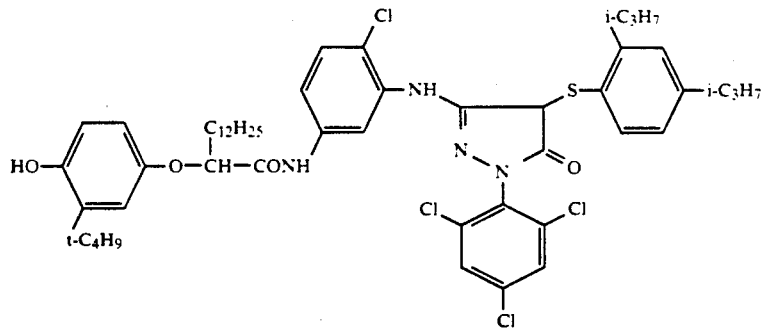

PP 20

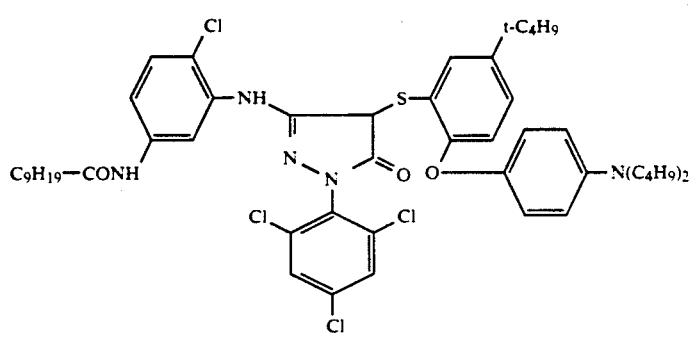

PP 21

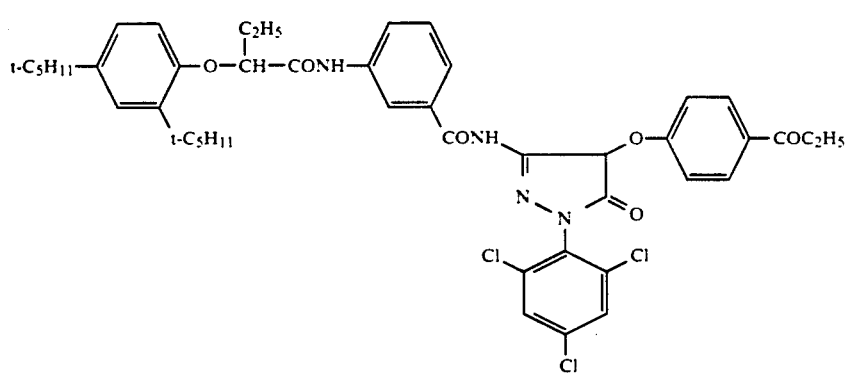

PP 22

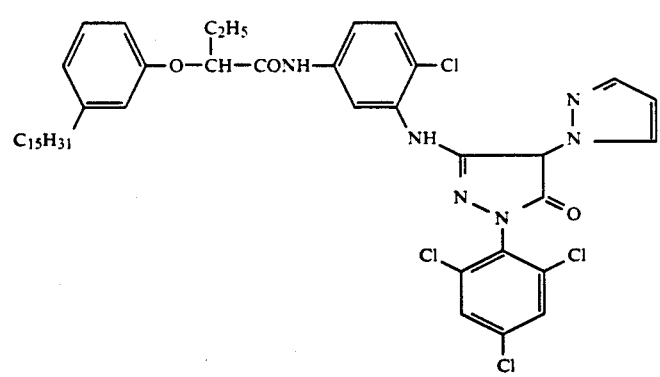

PP 23

Colour couplers for producing the yellow partial colour image are generally couplers containing an open chain ketomethylene group, in particular couplers of the α-acylacetamide series. α-Benzoylacetanilide couplers and α-pivaloylacetanilide couplers corresponding to the following formulae are suitable examples of such couplers:

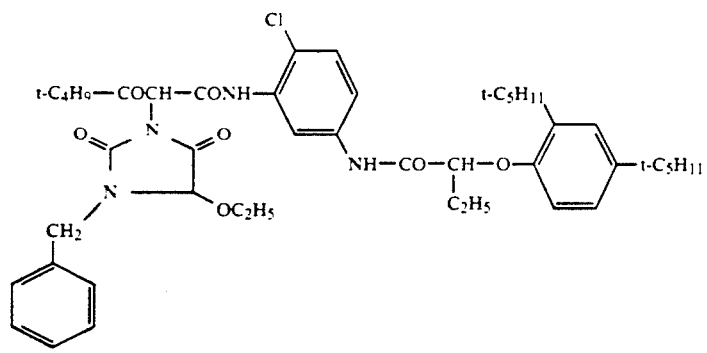
GB 1
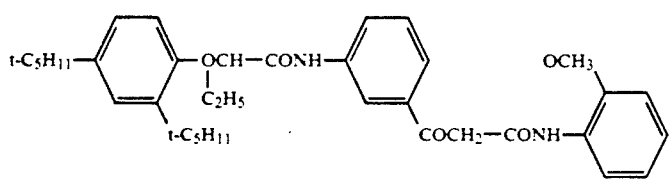
GB 2
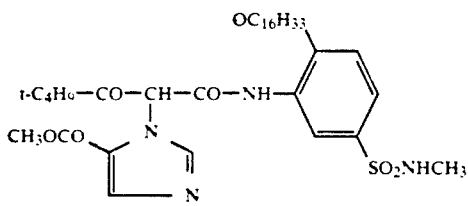
GB 3
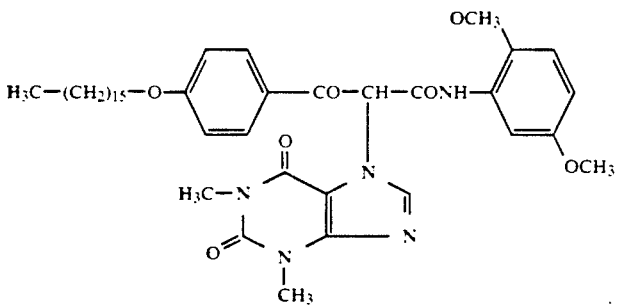
GB 4
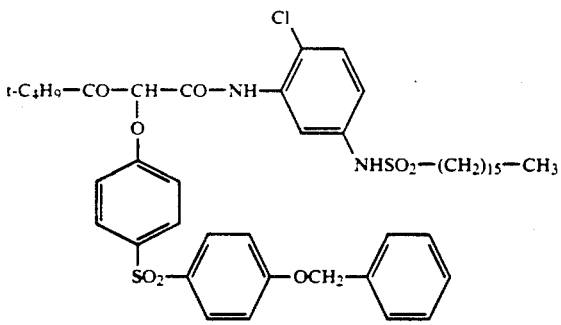
GB 5
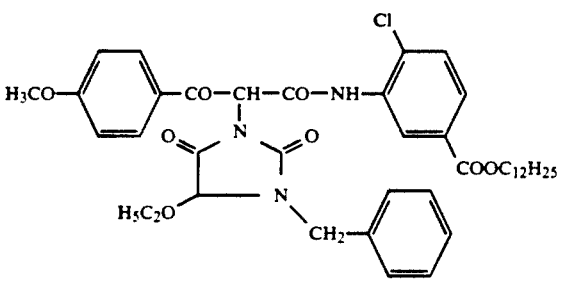
GB 6

-continued
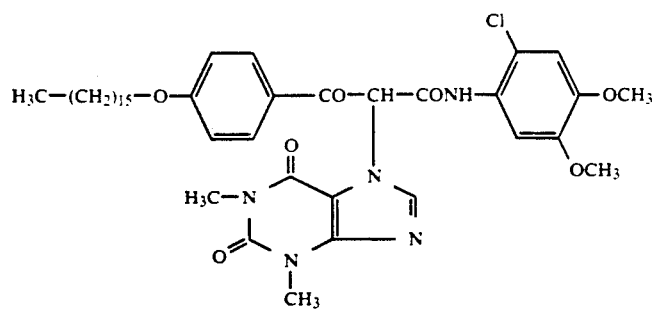
GB 7
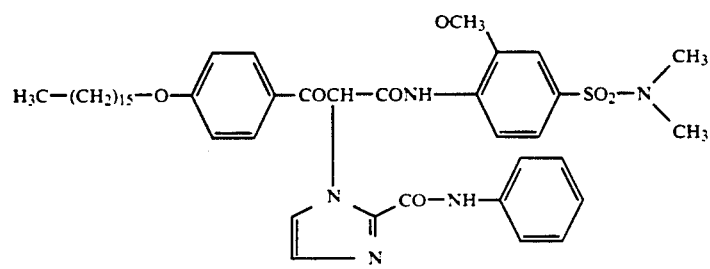
GB 8
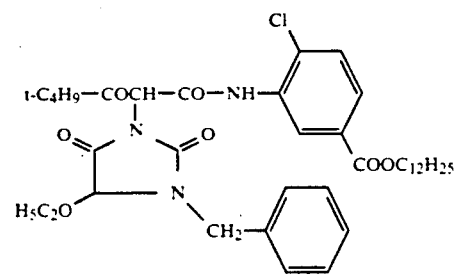
GB 9
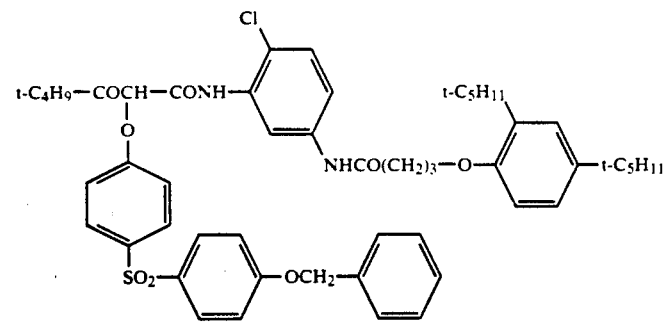
GB 10
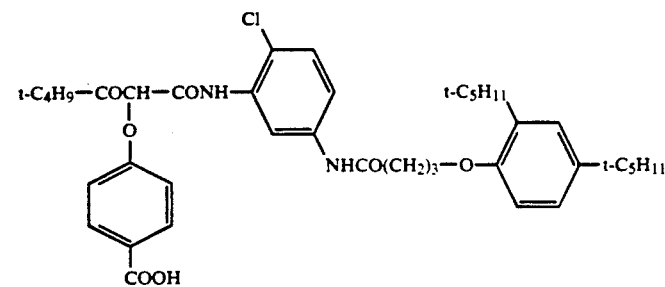
GB 11

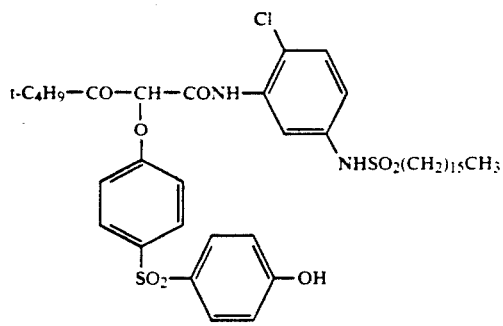
GB 12
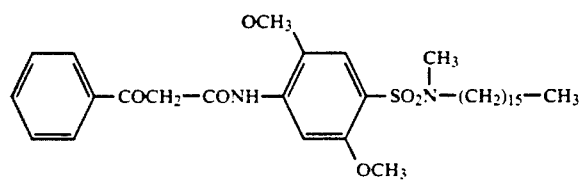
GB 13
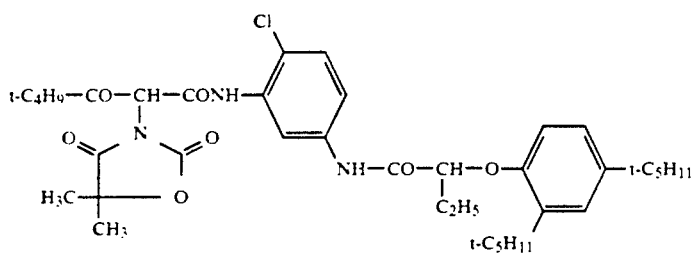
GB 14
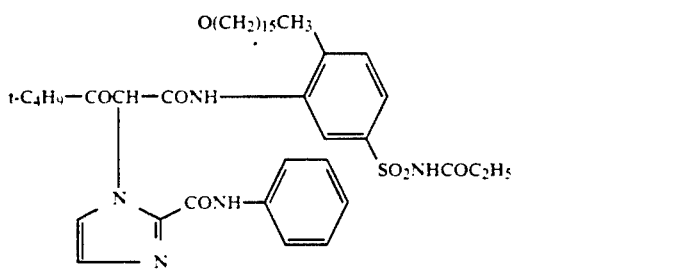
GB 15
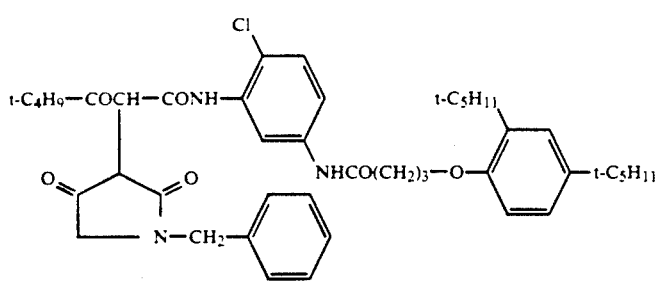
GB 16
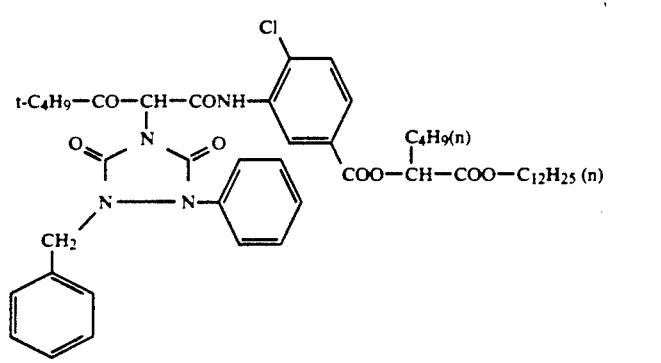
GB 17

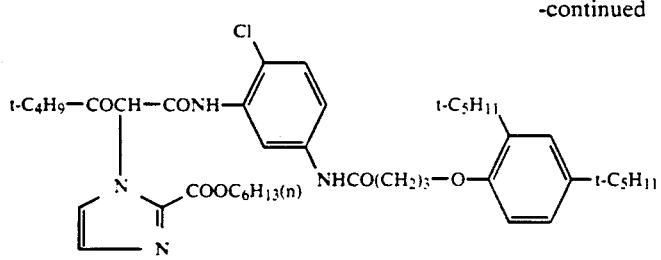

GB 18

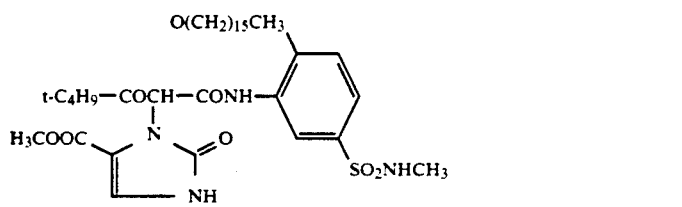

GB 19

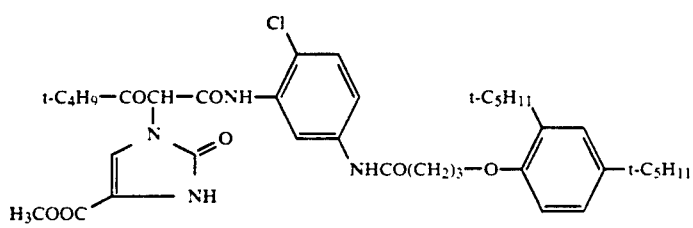

GB 20

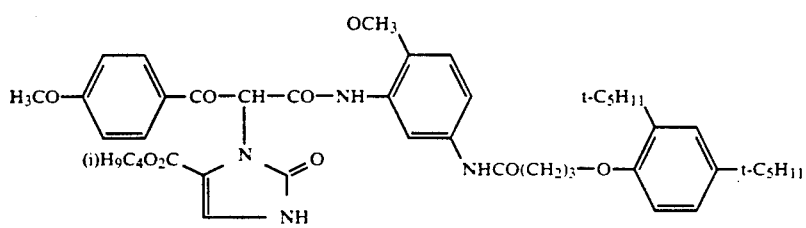

GB 21

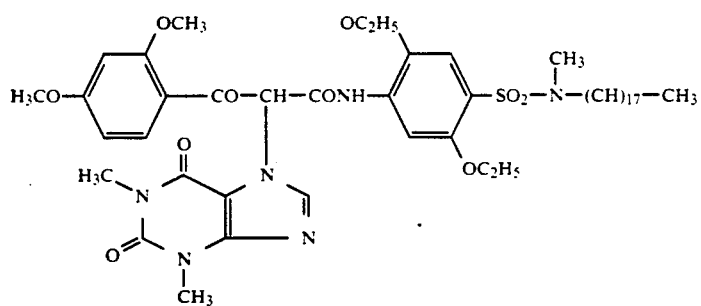

GB 22

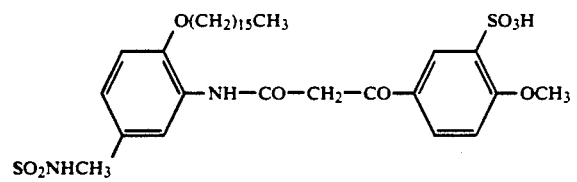

GB 23

The colour couplers may be 4-equivalent couplers or 2-equivalent couplers. The latter are derived from 4-equivalent couplers in that they carry, in the coupling position, a substituent which is split off in the coupling reaction. 2-Equivalent couplers include both colourless couplers and couplers which have an intense colour of their own which disappears in the process of colour coupling and may be replaced by the colour of the image dye produced (masking couplers) as well as white couplers which give rise to mainly colourless products in their reaction with colour developer oxidation products. The 2-equivalent couplers also includes couplers which carry in the coupling position a removable group which is released in the reaction with colour developer oxidation products to give rise to a particular desired photographic activity, e.g. as development inhibitor or accelerator, either directly or after one or more further groups have been split off from the group originally removed (e.g. DE-A27 03 145, DE-A-28 55 697, DE-A-31 05 026, DE-A-33 19 428). Examples of such 2-equivalent couplers include the known DIR couplers as well as DAR and FAR couplers.
The following are examples of white couplers:
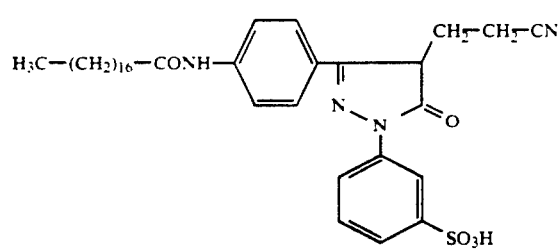
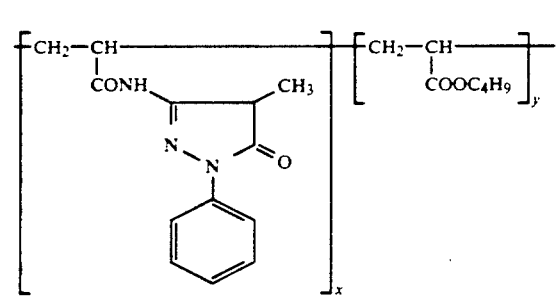
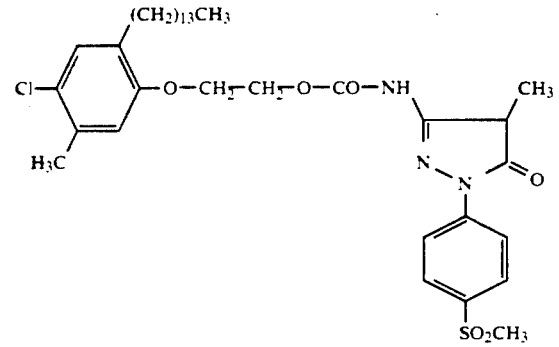
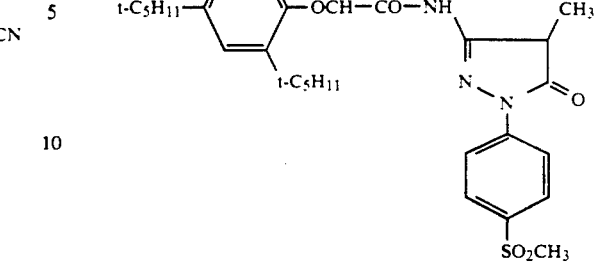
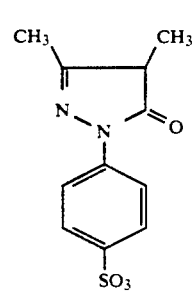
The following are examples of masking couplers:
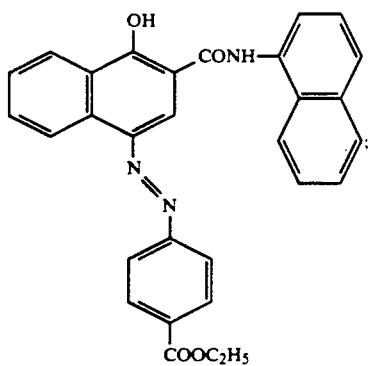

-continued
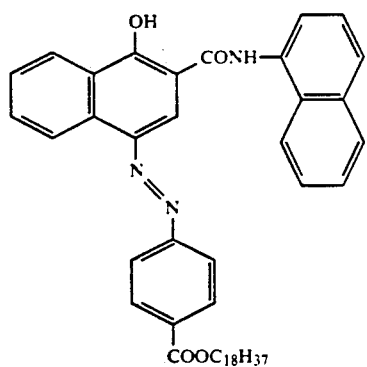
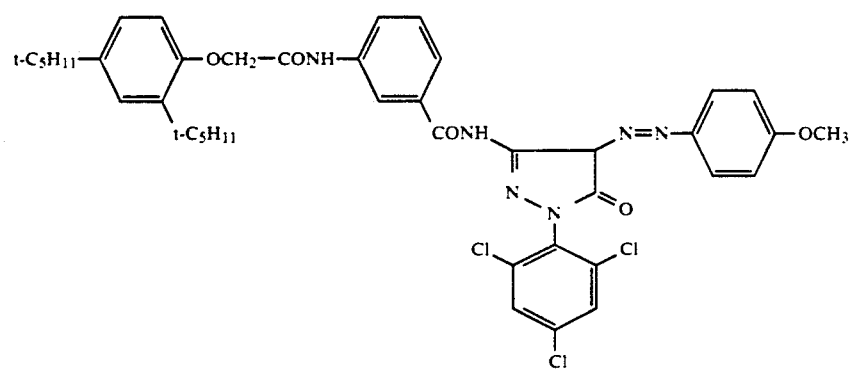
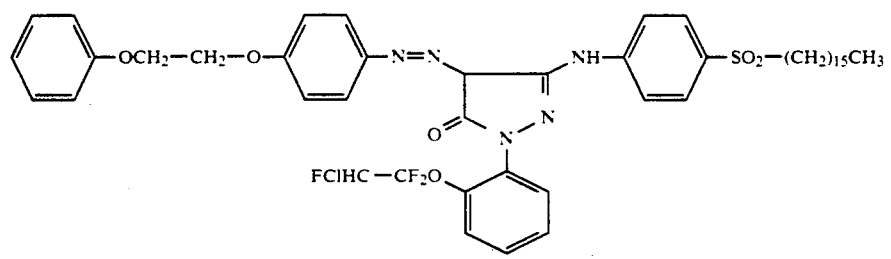
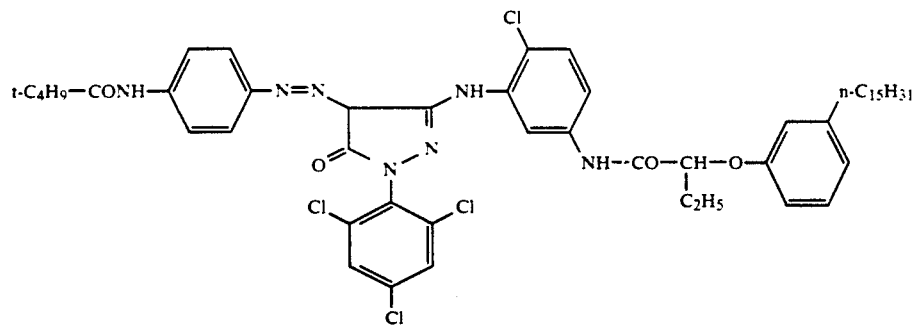
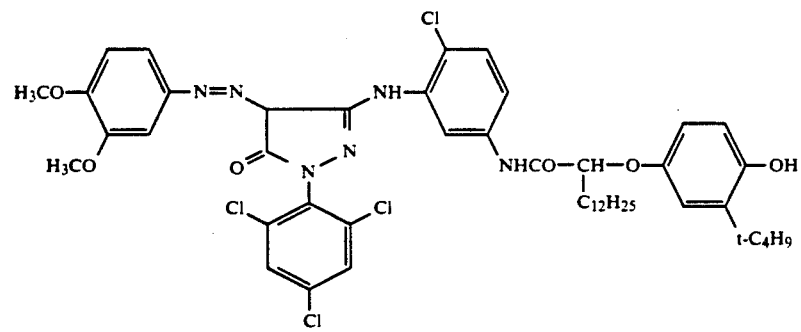

-continued
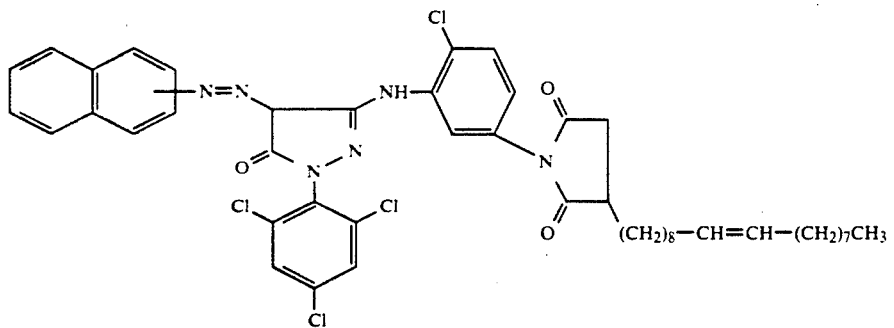
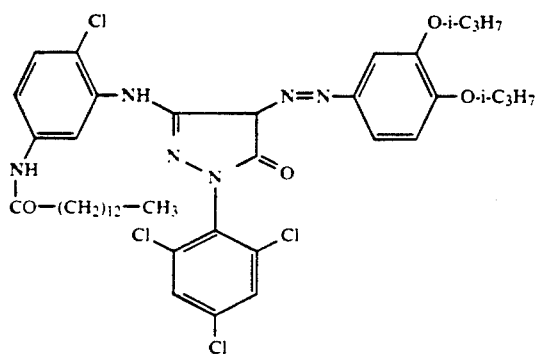
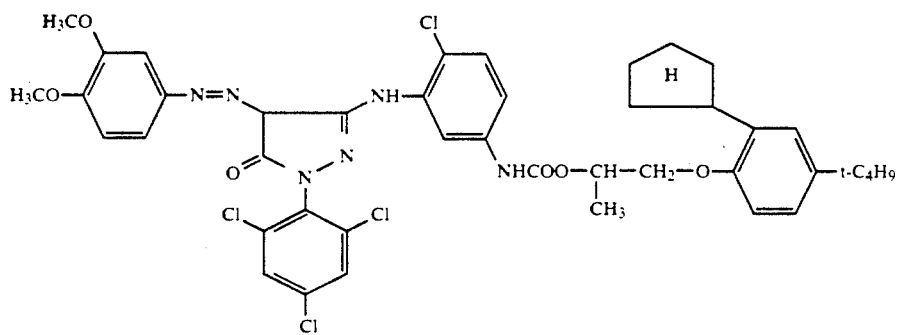
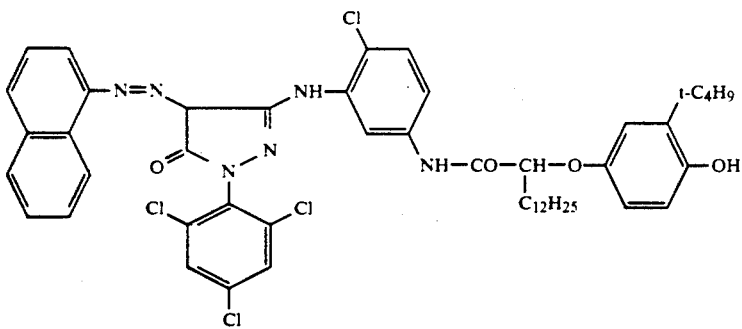
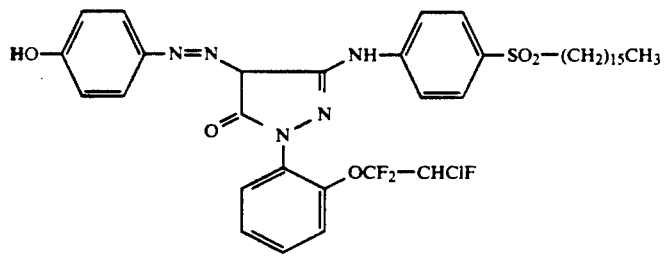

-continued
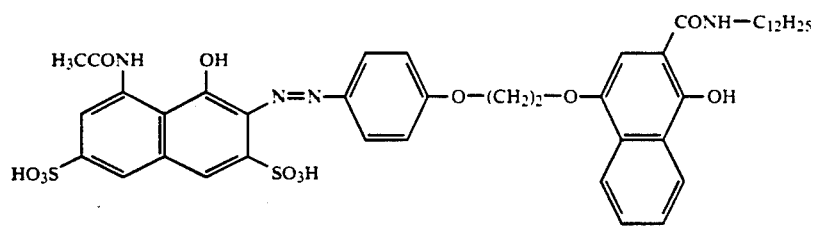
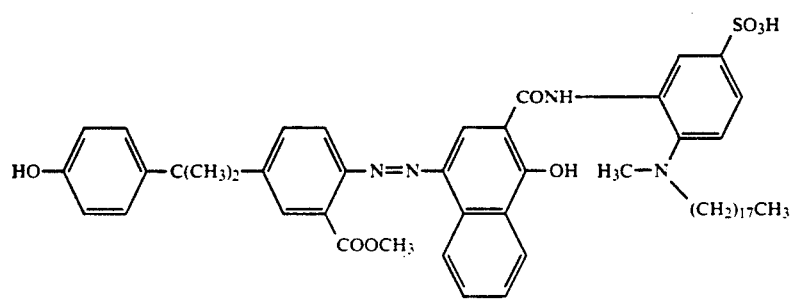
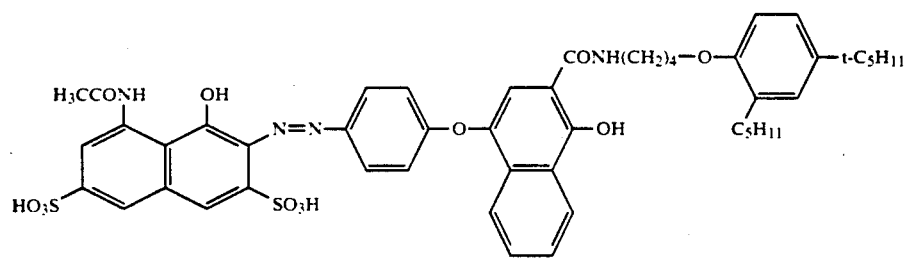
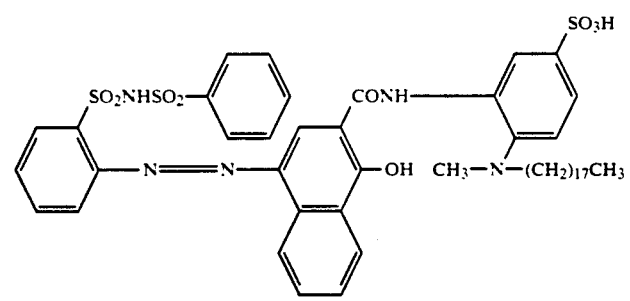
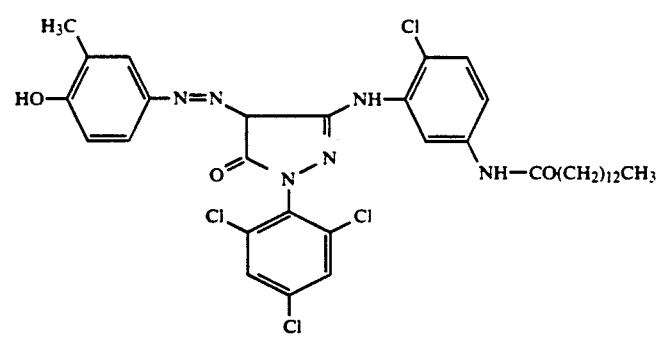

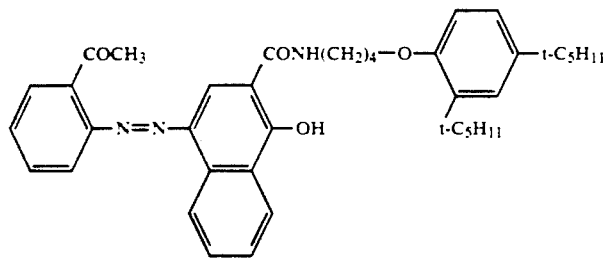
-continued

DIR couplers which release development inhibitors of the azole series, such as triazoles and benzotriazoles, are described in DE-A-2 414 006, 2 610 546, 2 659 417, 2 754 281, 2 726 180, 3 626 219, 3 630 564, 3 636 824, 3 644 416 and 2 842 063. Further advantages for colour reproduction, i.e. colour separation and colour purity and for reproduction of detail, i.e. sharpness and graininess, may be achieved with DIR couplers of the type which, for example, release the development inhibitor not directly as a result of the coupling reaction with an oxidized colour developer but only after a secondary reaction, for example with a time control group. Examples of such couplers are described in DE-A-28 55 697, 32 99 671, 38 18 231 and 35 18 797, EP-A-157 146 and 204 175, U.S. Pat. Nos. 4,146,396 and 4,438,393 and GB-A-2 072 363.

DIR couplers releasing a development inhibitor which decomposes in the development bath into products which are mainly photographically inactive are described, for example, in DE-A-32 09 486 and in EP-A-167 168 and 219 713. The use of such couplers ensures trouble-free development and constancy of processing.

When DIR couplers are used, especially those which release a readily diffusible development inhibitor, improvements in the colour reproduction, e.g. differentiated colour reproduction, may be achieved by suitable measures in optical sensitization as described, for example, in EP-A,115 304, 167 173, GB-A-2 165 058, DE-A-3 700 419 and U.S. Pat. No. 4,707,436.

The DIR couplers may be added to any of a variety of layers in a multi-layered photographic material, including, for example, light-insensitive layers or interlayers but they are preferably added to the light-sensitive silver halide emulsion layers, in which case the characteristic properties of the silver halide emulsion, e.g. its iodide content, the structure of the silver halide grains or the grain size distribution, are of influence on the photographic properties obtained. The influence of the released inhibitors may be limited, for example by the incorporation of an inhibitor acceptor layer according to DE-A-24 31 223. It may be advantageous for reasons of reactivity or stability to use a DIR coupler which couples to produce a different colour in the layer into which it is introduced from the colour which is required to be produced in this layer.

DAR and FAR couplers which release a development accelerator or a foggant are particularly suitable for increasing the sensitivity, the contrast and the maximum density. Compounds of this type are described, for example, in DE-A-2 534 466, 3 209 110, 3 333 355, 3 410 616, 3 429 545 and 3 441 823, in EP-A-89 834, 110 511, 118 087 and 147 765 and in U.S. Pat. Nos. 4,618,572 and 4,656,123.

For an example of the use of DAR couplers, see EP-A-193 389.

It may be advantageous to modify the effect of a photographically active group released from a coupler by causing an inter-molecularly reaction to take place between this group and another group after its release, in accordance with DE-A-3 506 805.

The following are examples of DIR couplers:

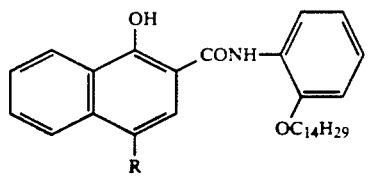

DIR 1

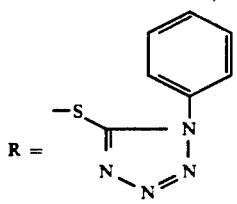

DIR 2

-continued
DIR 3
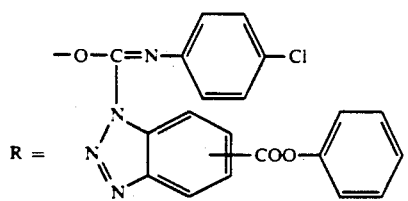
DIR 4
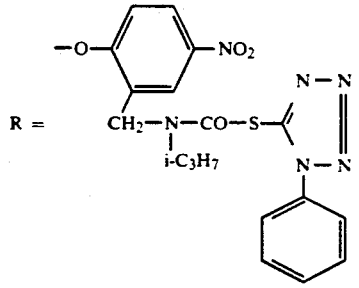
DIR 5
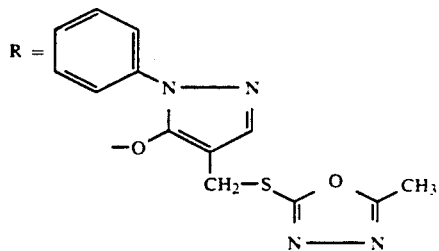
DIR 6
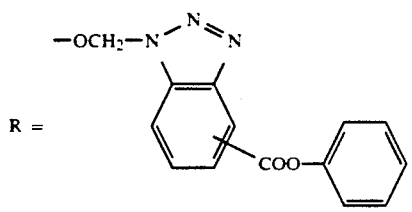
DIR 7
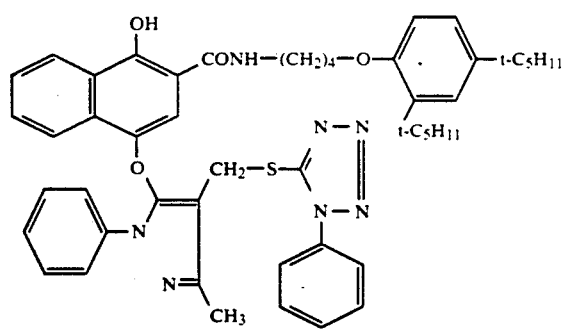
DIR 8
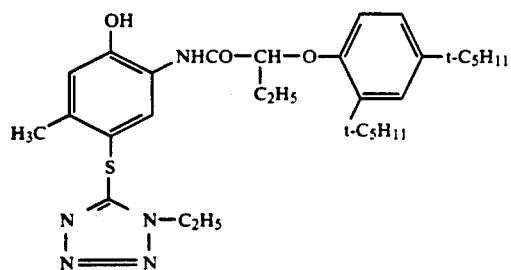

-continued
DIR 9
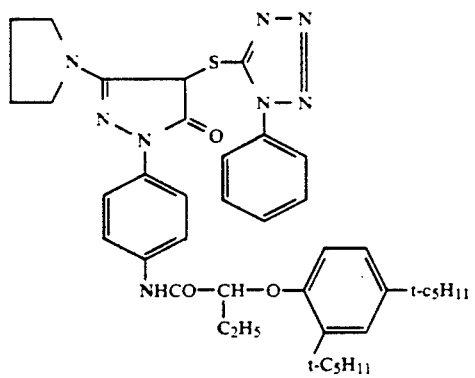
DIR 10
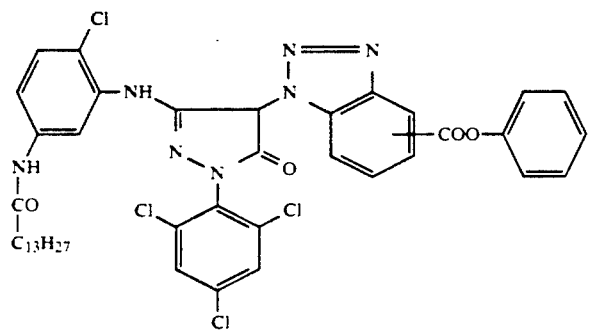
DIR 11
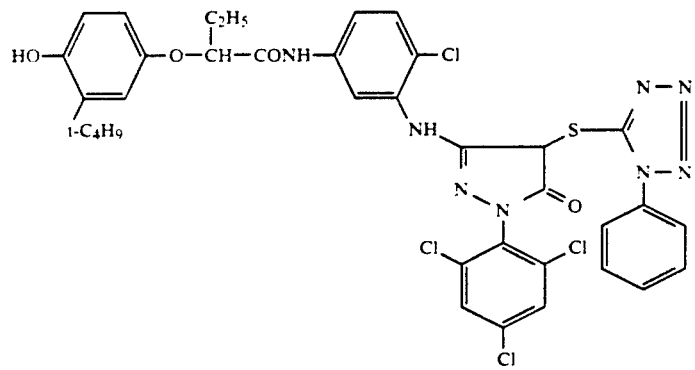
DIR 12
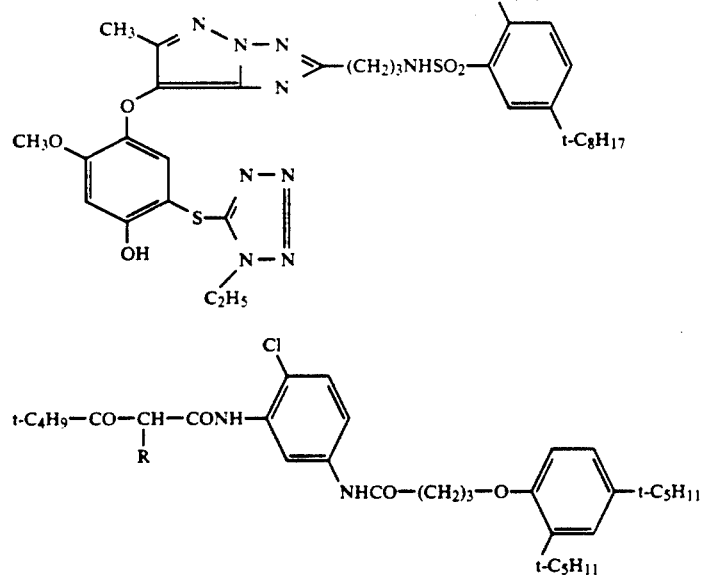

-continued
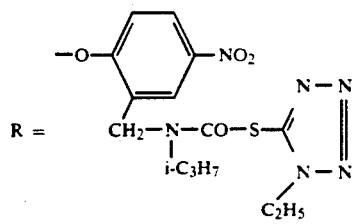
DIR 13
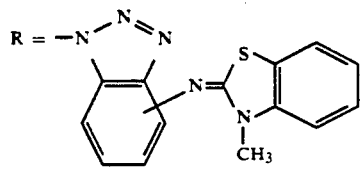
DIR 14
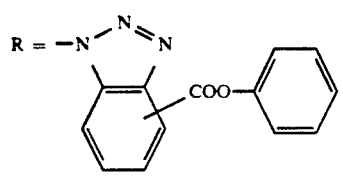
DIR 15
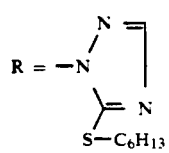
DIR 16
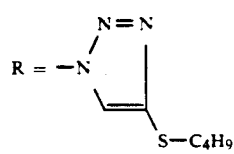
DIR 17
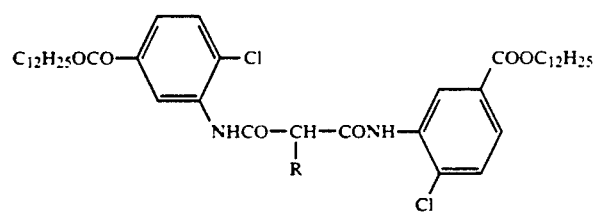
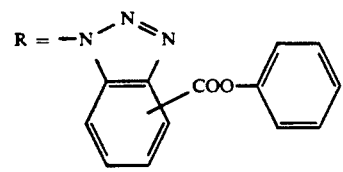
DIR 18
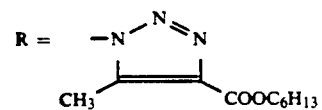
DIR 19
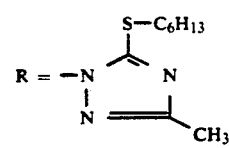
DIR 20

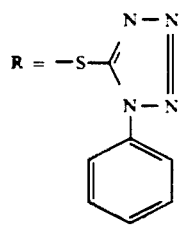

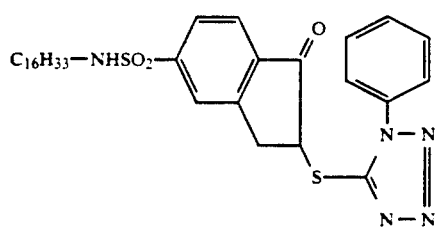

DIR 21

DIR 22

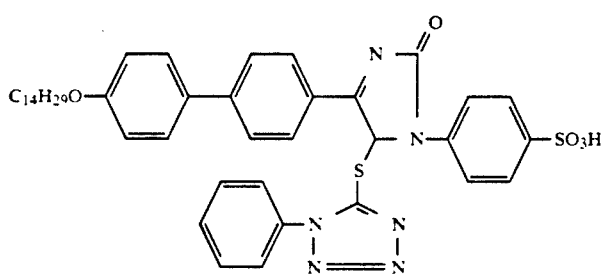

DIR 23

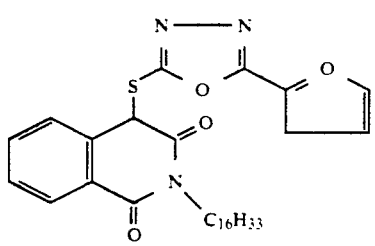

DIR 24

Examples for DAR couplers are:

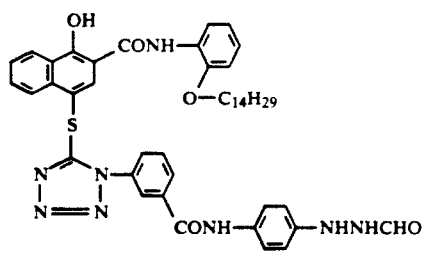

DAR 1

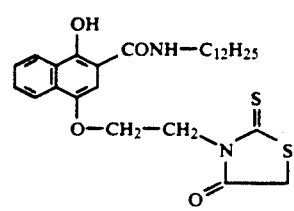

DAR 2

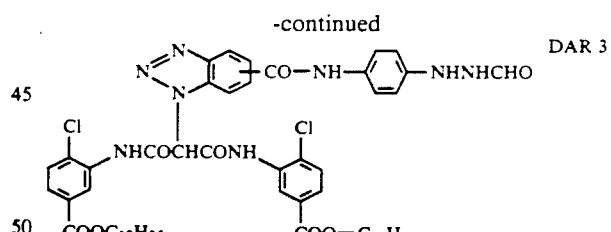

DAR 3

Since the DIR, DAR and FAR couplers are required mainly for the activity of the group released in the coupling reaction and less for the colour producing properties of these couplers, it is quite suitable to use DIR, DAR or FAR couplers which give rise to mainly colourless products in the coupling reaction (DE-A-1 547 640).

The group which is split off may be a ballast group so that the reaction with colour developer oxidation products gives rise to coupling products which are diffusible or at least have a weak, limited mobility (U.S. Pat. No. 4,420,556).

The material may contain compounds other than couplers, for example compounds capable of releasing a development inhibitor, a development accelerator, a bleaching accelerator, a developer, a silver halide solvent, a foggant or an antifoggant. Examples include the so-called DIR hydroquinones and other compounds described, for example, in U.S. Pat. Nos. 4,636,546, 4,345,024, 4,684,604 and DE-A-3 145 640, 2 515 213 and 2 447 079 and EP-A-198 438. These compounds fulfil the same function as DIR, DAR or FAR couplers except that they do not give rise to coupling products.

High molecular weight colour couplers are described, for example, in DE-C-1 297 417, DE-A-24 07 569, DE-A-31 48 125, DE-A-32 17 200 DE-A-33 20 079, DE-A-33 24 932, DE-A-33 31 743, DE-A-33 40 376, EP-A-27 284 and U.S. Pat. No. 4,080,211. The high molecular weight colour couplers are generally prepared by the polymerisation of ethylenically unsaturated monomeric colour couplers but they may also be obtained by polyaddition or polycondensation.

The incorporation of couplers or other compounds in silver halide emulsion layers may be carried out by first preparing a solution, dispersion or emulsion of the particular compound and then adding this to the casting solution for the layer in which it is to be incorporated. The choice of suitable solvents or dispersing agents depends upon the solubility of the compound.

Methods of introducing substantially water-insoluble compounds by grinding or milling are described, for example, in DE-A-2 609 741 and DE-A-2 609 742.

Hydrophobic compounds may also be introduced into the casting solution by means of high boiling solvents, so-called oil-formers. Suitable methods are described, for example, in U.S. Pat. No. 2,322,027, U.S. Pat. No. 2,801,170, U.S. Pat. No. 2,801,171 and EP-A-0 043 037.

Oligomers or polymers, so-called polymeric oil formers, may be used instead of high boiling solvents.

The compounds may also be introduced into the casting solution in the form of charged latices; see, for example, DE-A-2 541 230, DE-A-2 541 274, DE-A-2 835 856, EP-A-0 014 921 EP-A-0 069 671, EP-A-0 130 115 and U.S. Pat. No. 4,291,113.

Anionic water-soluble compounds (e.g. dyes) may also be incorporated in a diffusion fast form by means of cationic polymers, so-called mordanting polymers.

Examples of suitable oil formers include phthalic acid alkyl esters, phosphonic acid esters, phosphoric acid esters, citric acid esters, benzoic acid esters, amides, fatty acid esters, trimesic acid esters, alcohols, phenols, aniline derivatives and hydrocarbons.

The following are examples of suitable oil formers: Dibutylphthalate, dicyclohexylphthalate, di-2-ethylhexylphthalate, decylphthalate, triphenylphosphate, tricresylphosphate, 2-ethylhexyldiphenylphosphate, tricyclohexylphosphate, tri-2-ethylhexylphosphate, tridecylphosphate, tributoxyethylphosphate, trichloropropylphosphate, di-2-ethylhexylphenylphosphate, 2-ethylhexylbenzoate, dodecylbenzoate, 2-ethylhexyl-p-hydroxybenzoate, diethyldodecanamine, N-tetradecylpyrrolidone, isosterayl alcohol, 2,4-di-tert.-amylphenol, dioctylacetate, glycerol tributyrate, isostearyllactate, trioctylcitrate, N,N-dibutyl, 2-butoxy-5-tert-octylaniline, paraffin, dodecylbenzene and diisopropylnaphthalene.

Each of the differently sensitized light-sensitive layers may consist of one single layer or of two or more silver halide emulsion layers (DE-C-1 121 470). Red-sensitive silver halide emulsion layers are frequently arranged closer to the layer support than green-sensitive silver halide emulsion layers which in turn are arranged closer to the support than blue-sensitive layers and a light-insensitive yellow filter layer is generally placed between the green-sensitive layers and the blue-sensitive layers.

If the intrinsic sensitivity of the green-sensitive or the red-sensitive layers is sufficiently low, the yellow filter layer may be dispensed with and other layer arrangements may be employed in which, for example, the blue-sensitive layers are placed on the support, followed by the red-sensitive layers and lastly the green-sensitive layers.

The light-insensitive interlayers generally placed between layers of differing spectral sensitivities may contain substances which prevent unwanted diffusion of developer oxidation products from one light-sensitive layer into another light-sensitive layer of a different spectral sensitization.

Suitable substances of this type, also known as scavengers or EOP acceptors, are described in Research Disclosure 17643/1978, Chapter VII, 17 842/1979, pages 94-97 and 18 716/1979, page 650 and in EP-A-69 070, 98 072, 124 877 and 125 522 and in U.S. Pat. No. 463.226.

The following are examples of particularly suitable compounds:

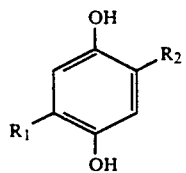

$R_1, R_2 =$ -t-$C_8H_{17}$
-sec-$C_{12}H_{25}$
-t-$C_6H_{13}$

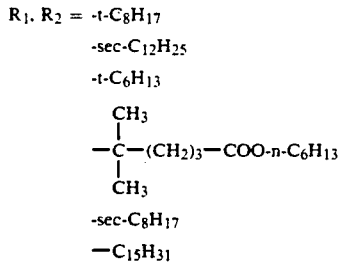

-sec-$C_8H_{17}$
—$C_{15}H_{31}$

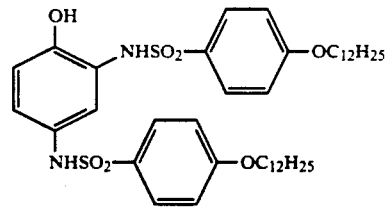

Where several partial layers of the same spectral sensitisation are present, these may differ from one another in their composition in particular in the nature and quantity of the silver halide grains. The partial layer which has the higher sensitivity is generally arranged further away from the support than the partial layer of lower sensitivity. Partial layers having the same spectral sensitization may be arranged adjacent to one another or separated by other layers, e.g. layers of a different spectral sensitization. Thus, for example, all highly sensitive layers may be combined to form one layer packet and all layers of low sensitivity may be combined into another layer packet (DE-A-1 958 709, DE-A-2 530 645, DE-A-2 622 922).

The photographic material may also contain compounds which absorb UV light, white toners, spacers, filter dyes, formalin acceptors, light-protective agents, anti-oxidants, correction dyes and additives for improving the stabilization of the dyes, the couplers and the whites and for reducing the colour fog, etc.

Compounds which absorb UV light are required on the one hand to prevent the image dyes from being bleached by daylight with a high UV content and on the other hand to serve as filter dyes to absorb the UV light present in daylight when the film is being exposed in order to improve the colour reproduction of the film. Compounds with different structures are normally used for these two different functions. Examples include aryl substituted benzotriazole compounds (U.S. Pat. No. 3,533,794), 4-thiazolidone compounds (U.S. Pat. Nos. 3,314,794 and 3,352,681), benzophenone compounds (JP-A-2 784/71), cinnamic acid ester compounds (U.S. Pat. Nos. 3,705,805 and 3,707,375), butadiene compounds (U.S. Pat. No. 4,045,229) and benzoxazole compounds (U.S. Pat. No. 3,700,455). The following are examples of particularly suitable compounds:

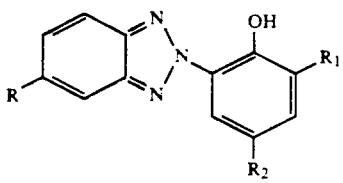

R, $R_1$ = H; $R_2$ = t-$C_4H_9$

R = H;    $R_1$, $R_2$ = t-$C_4H_9$·

R = H;    $R_1$, $R_2$ = t-$C_5H_{11}$-tert.

R = H;    $R_1$ = sec-$C_4H_9$;    $R_2$ = t-$C_4H_9$

R = Cl;    $R_1$ = t-$C_4H_9$;    $R_2$ = sec-$C_4H_9$

R = Cl;    $R_1$, $R_2$ = t-$C_4H_9$

R = Cl;    $R_1$ = t-$C_4H_9$-tert.;    $R_2$ = —$CH_2$—$CH_2$—$COOC_8H_{17}$

R = H;    R = iso-$C_{12}H_{25}$;    $R_2$ = $CH_3$

R, $R_1$, $R_2$ = t-$C_4H_9$

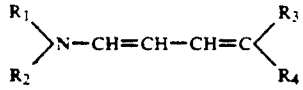

$R_1$, $R_2$ = n-$C_6H_{13}$;    $R_3$, $R_4$ = CN

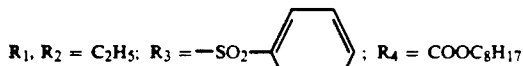

$R_1$, $R_2$ = $C_2H_5$; $R_3$ =—$SO_2$—  ; $R_4$ = $COOC_8H_{17}$

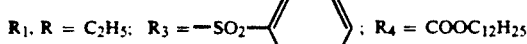

$R_1$, R = $C_2H_5$; $R_3$ =—$SO_2$—  ; $R_4$ = $COOC_{12}H_{25}$ $R_1$, $R_2$ = $CH_2$=CH—$CH_2$;    $R_3$, $R_4$ = CN

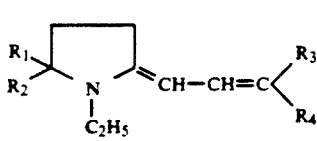

$R_1$, $R_2$ = H;    $R_3$ = CN;    $R_4$ = CO—$NHC_{12}H_{25}$ $R_1$, $R_2$ = $CH_3$; $R_3$ = CN;    $R_4$ = CO—$NHC_{12}H_{25}$

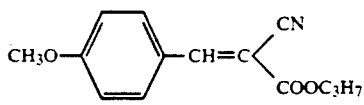

Ultraviolet absorbent couplers (such as cyan couplers of the α-naphthol series) and ultraviolet absorbent polymers may also be used. These ultraviolet absorbents may be fixed in a particular layer by mordanting.

Filter dyes suitable for visible light include oxonole dyes, hemioxonole dyes, styryl dyes, merocyanine dyes, cyanine dyes and azo dyes. Among these, oxonole dyes, hemioxonole dyes and merocyanine dyes are particularly suitable.

Suitable white tones are described e.g. in Research Disclosure, December 1978, pages 22 seq, Report No. 17643, Chapter V, in U.S. Pat. Nos. 2,632,701 and 3,269,840 and in GB-A-852 075 and 1 319 763.

Certain layers of binders, in particular the layer furthest removed from the support but occasionally also interlayers, especially if they are furthest removed from the support during the preparation of the material, may contain photographically inert particles of an inorganic or organic nature, e.g. as matting agents or as spacers (DE-A-3 331 542, DE-A-3 424 893, Research Disclosure December 1978, pages 22 et seq. Report No. 17643, Chapter XVI).

The average particle diameter of the spacers is mainly in the range of from 0.2 to 10 μm. The spacers are insoluble in water and may be either soluble or insoluble in alkalies, those which are soluble in alkalies being generally removed from the photographic material in the alkaline development bath. Examples of suitable polymers include polymethylmethacrylate, copolymers of acrylic acid and methylmethacrylate and hydroxypropylmethyl cellulose hexahydrophthalate.

The following are examples of suitable formalin acceptors:

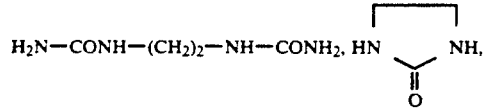

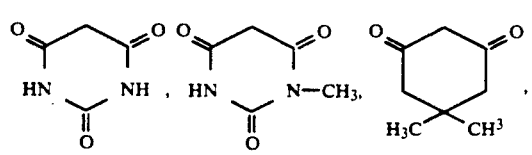

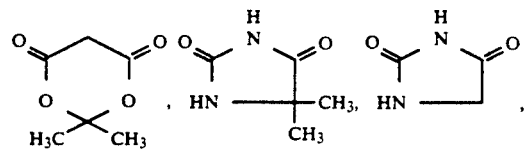

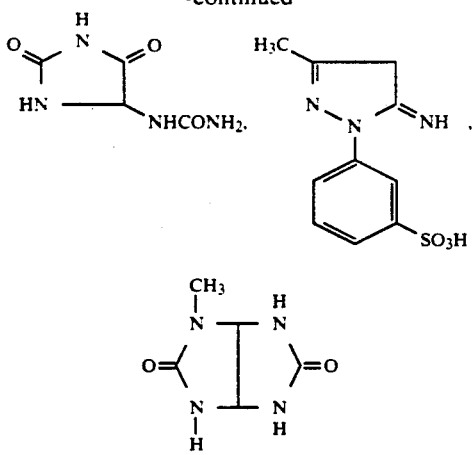

Additives for improving the stability of the dyes, the couplers and the whites and for reducing the colour fog (Research Disclosure 17643/1978 Chapter VII) may belong to the following chemical classes of compounds: Hydroquinones, 6-hydroxychromans, 5-hydroxycoumarans, spirochromans, spiroindans, p-alkoxyphenols, sterically hindered phenols, gallic acid derivatives, ethylene dihydroxybenzenes, aminophenols, sterically hindered amines, derivatives containing esterified or etherified phenolic hydroxyl groups, and metal complexes.

Compounds containing both a sterically hindered amine partial structure and a sterically hindered phenol partial structure in one molecule (U.S. Pat. No. 4,268,593) are particularly effective in preventing the impairment (deterioration or degradation of yellow coupler images as a result of exposure to heat, moisture or light. Spiroindans (JP-A-159 644/81) and chromans substituted by hydroquinone diethers or monoethers (JP-A-89 835/80) are particularly effective in preventing any impairment (deterioration or degradation) of magenta colour images in particular impairment (deterioration or degradation) caused by the action of light.

The following are examples of particularly suitable compounds:

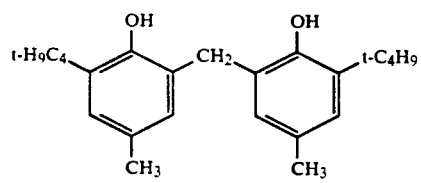

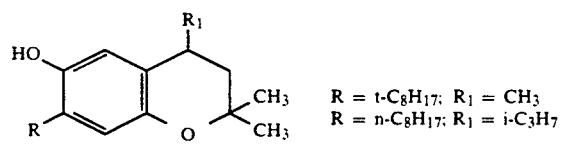

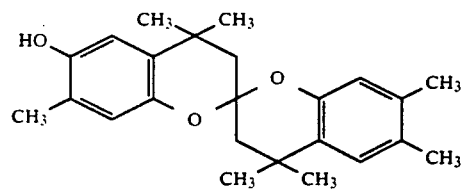

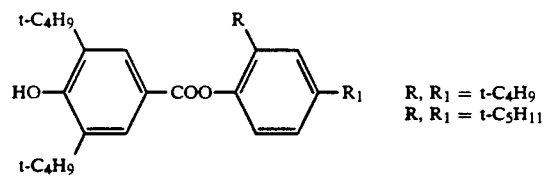

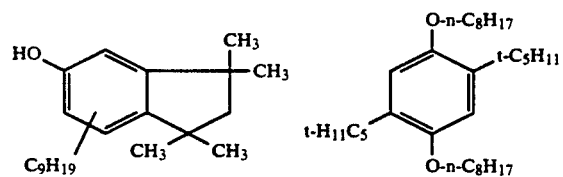

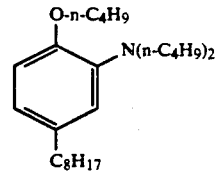

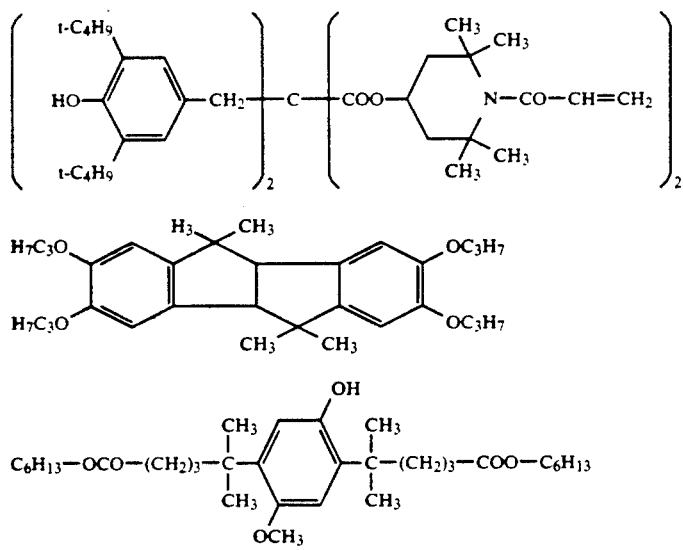

as well as the compounds mentioned as EOP acceptors.

The layers of the photographic material may be hardened with conventional hardeners. Examples of suitable hardeners include formaldehyde, glutaraldehyde and similar aldehyde compounds, diacetyl, cyclopentadione and similar ketone compounds, bis-(2-chloroethylurea), 2-hydroxy-4 6-dichloro-1,3,5-triazine and other compounds containing reactive halogen (U.S. Pat. No. 3,288,775, U.S. Pat. No. 2,732,303, GB-A-974 723 and GB-A-1 167 207), divinylsulphone compounds, 5-acetyl-1,3-diacryloyl-hexahydro-1,3,5-triazine and other compounds containing a reactive olefine bond (U.S. Pat. No. 3,635,718, U.S. Pat. No. 3,232,763 and GB-A-994 869); N-hydroxymethylphthalimide and other N-methylol compounds (U.S. Pat. No. 2,732,316 and U.S. Pat. No. 2,586,168); isocyanates (U.S. Pat. No. 3,103,437); aziridine compounds (U.S. Pat. No. 3,017,280 and U.S. Pat. No. 2,983,611); acid derivatives (U.S. Pat. No. 2,725,294 and U.S. Pat. No. 2,725,295); compounds of the carbodiimide type (U.S. Pat. No. 3,100,704); carbamoyl pyridinium salts (DE-A-2 225 230 and DE-A-2 439 551); carbamoyloxypyridinium compounds (DE-A-2 408 814); compounds containing a phosphorus-halogen bond (JP-A-113 929/83); N-carbonyloximide compounds (JP-A-43353/81); N-sulphonyloximido compounds (U.S. Pat. No. 4,111,926) dihydroquinoline compounds (U.S. Pat. No. 4,013,468): 2-sulphonyloxypyridinium salts (JP-A-110 762/81); formamidinium salts (EP-A-0 162 308); compounds containing two or more N-acyloximino groups (U.S. Pat. No. 4,052,373); epoxy compounds (U.S. Pat. No. 3,091,537); compounds of the isoxazole type (U.S. Pat. No. 3,321,313 and U.S. Pat. No. 3,543,292); halogen carboxyaldehydes such as mucochloric acid dioxane derivatives such as dihydroxydioxane and dichlorodioxane; and inorganic hardeners such as chrome alum and zirconium sulphate.

Hardening may be brought about in known manner by adding the hardener to the casting solution for the layer which is to be hardened or by coating the layer which is to be hardened with a layer containing a diffusible hardener.

The classes of hardeners mentioned above include slow acting and quick acting hardeners as well as so-called instant hardeners, which are particularly advantageous. Instant hardeners are compounds which bring about cross-linking of suitable binders at such a rate that hardening is sufficiently completed immediately after casting or at the latest after 24 hours, preferably after not more than 8 hours, to prevent any further change in the sensitometry or swelling of the combination of layers due to cross-linking. Swelling is the difference between the wet layer thickness and the dry layer thickness of a film which is processed under aqueous conditions (Photogr. Sci., Eng. 8 (1964), 275; Photogr. Sci. Eng. (1972), 449).

These hardeners which react very rapidly with gelatine may be, for example, carbamoyl pyridinium salts which are capable of reacting with free carboxyl groups of gelatine so that the latter react with free amino groups of gelatine to form peptide bonds and bring about cross-linking of the gelatine.

Suitable examples of instant hardeners include compounds corresponding to the following general formulae:

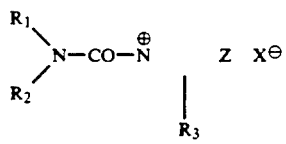

wherein
$R_1$ denotes alkyl, aryl or aralkyl,
$R_2$ has the same meaning as $R_1$ or denotes alkylene, arylene, aralkylene or alkaralkylene and the second bond is attached to a group corresponding to the following formula

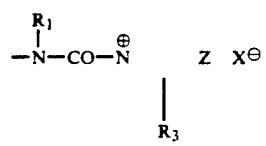

or $R_1$ and $R_2$ together denote the atoms required for completing an optionally substituted heterocyclic ring, for example a piperidine, piperazine or morpholine ring which may be substituted e.g. by $C_1$-$C_3$-alkyl or by halogen, $R_3$ denotes hydrogen, alkyl, aryl, alkoxy, $NR_4$—$COR_5$, $(CH_2)_m$—$NR_8R_9$, $(CH_2)_n$—$CONR_{13}R_{14}$ or $(CH_2)_p$—CH—Y—$R_{16}$

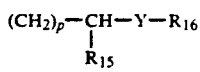

or a bridging member or a direct link to a polymer chain, and $R_4$, $R_6$, $R_7$, $R_9$, $R_{14}$, $R_{15}$, $R_{17}$, $R_{18}$ and $R_{19}$ denote hydrogen or $C_1$-$C_4$-alkyl, $R_5$ denotes hydrogen, $C_1$-$C_4$-alkyl or $NR_6R_7$, $R_8$ denotes $COR_{10}$, $R_{10}$ denotes $NR_{11}R_{12}$, $R_{11}$ denotes $C_1$-$C_4$-alkyl or aryl, in particular phenyl, $R_{12}$ denotes hydrogen, $C_1$-$C_4$-alkyl or aryl, in particular phenyl, $R_{13}$ denotes hydrogen, $C_1$-$C_4$-alkyl or aryl in particular phenyl, $R_{16}$ denotes hydrogen, $C_1$-$C_4$-alkyl, $COR_{18}$ or $CONHR_{19}$, m denotes a number from 1 to 3, n denotes a number from 0 to 3, p denotes a number from 2 to 3 and Y denotes O or $NR_{17}$ or $R_{13}$ and $R_{14}$ together denote the atoms required for completing an optionally substituted heterocyclic ring, for example a piperidine, piperazine or morpholine ring, which ring may be substituted, e.g. by $C_1$-$C_3$-alkyl or by halogen, Z denotes the carbon atoms required for completing a 5-membered or 6-membered aromatic heterocyclic ring, optionally with a condensed benzene ring attached, and $X^\ominus$ denotes an anion, which is absent if an anionic group is already linked to the remainder of the molecule;

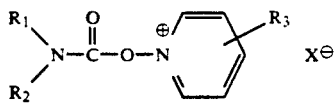 (b)

wherein $R_1$, $R_2$, $R_3$ and $X^\ominus$ have the meanings given for formula (a).

Some hardeners are diffusible and exert the same hardening action on all the layers within a combination of layers. Other hardeners, including both low molecular weight and high molecular weight hardeners, are non-diffusible and limited in their action to a particular layer. These may be used to effect particularly high cross-linking of individual layers, e.g. the protective layer. This is important if the silver halide layer undergoes less hardening owing to the increase in silver covering power and the mechanical properties are required to be improved by the protective layer (EP-A-0 114 699).

Colour photographic negative materials are generally processed by development, bleaching, fixing and washing or by development, bleaching and stabilization not followed by washing, the stages of bleaching and fixing being optionally combined as a single step of the process. The colour developer compounds used may be any developer compounds which are capable, in the form of their oxidation products, of reacting with colour couplers to form azomethine or indophenol dyes. Suitable colour developer compounds include aromatic compounds of the p-phenylenediamine series containing at least one primary amino group; for example, N,N-dialkyl-p-phenylenediamines such as N,N-diethyl-p-phenylenediamine, 1-(N-ethyl-N-methane-sulphonamidoethyl)-3-methyl-p-phenylenediamine, 1-(N-ethyl-N-hydroxyethyl)-3-methyl-p-phenylenediamine and 1-(N-ethyl-N-methoxyethyl)-3-methyl-p-phenylenediamine. Other suitable colour developers are described, for example, in J. Amer. Chem. Soc. 73, 3106 (1951) and by G. Haist in Modern Photographic Processing, 1979, John Wiley and Sons, New York, pages 545 et seq.

Colour development may be followed by an acid short stop bath or washing.

The material is normally bleached and fixed immediately after colour development. The bleaching agents used may be, for example, Fe(III) salts and Fe(III) complex salts such as ferricyanides, dichromates or water-soluble cobalt complexes. Iron-(III) complexes of aminopolycarboxylic acids are particularly preferred, especially, for example, the complexes of ethylenediaminotetracetic acid, propylenediaminotetracetic acid, diethylenetriaminopentacetic acid, nitrilotriacetic acid, iminodiacetic acid, N-hydroxyethylethylenediaminotriacetic acid and alkyliminodicarboxylic acids and the complexes of corresponding phosphonic acids. Persulphates are also suitable bleaching agents.

The bleach fixing or fixing bath is generally followed by washing which is carried out as a counterflow washing or may be carried out in several tanks with their separate water supplies.

Advantageous results may also be obtained by following this treatment with a final bath containing little or no formaldehyde.

Washing with water may, however, be replaced by a stabilizing bath, which is generally carried out in countercurrent. When formaldehyde is added, this stabilizing bath also takes over the function of a final bath.

EXAMPLES

LAYER EXAMPLE 1

The layers described below were applied in the sequence given to a transparent layer support of cellulose triacetate.

The quantities are based on 1 $m^2$. The quantities silver halide applied are given in terms of the equivalent quantities of $AgNO_3$.

The cyan correction dyes are added in the form of the above-described emulsions of casting solutions for the antihalation layer.

| 1st Layer (= antihalation layer) |
|---|
| 0.3 g/$m^2$ of black colloidal silver, |
| 1.4 g/$m^2$ of gelatine |
| 0.03 g/$m^2$ of cyan correction dye as indicated |
| 0.05 g/$m^2$ of 2,5-di-t-pentadecyl hydroquinone |
| 0.03 g/$m^2$ of diethyllauramide |
| 0.08 g/$m^2$ of tricresylphosphate |
| 2nd Layer (= light-sensitive silver halide layer) |
| 3.0 g of $AgNO_3$ per $m^2$ of a spectrally red-sensitized |

-continued

The following cyan correction dyes were used in the 1st layer:

| Layer arrangement | Dye |
|---|---|
| 1a (Comparison) | 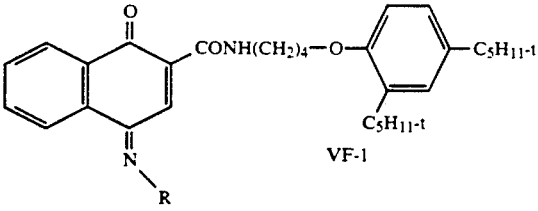 VF-1 |
| 1b (Comparison) | 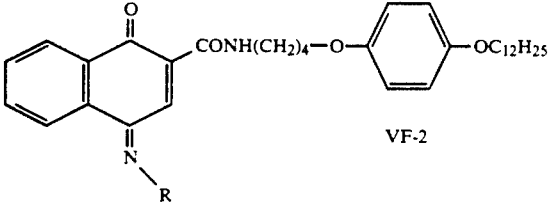 VF-2 |
| 1c (Invention) | 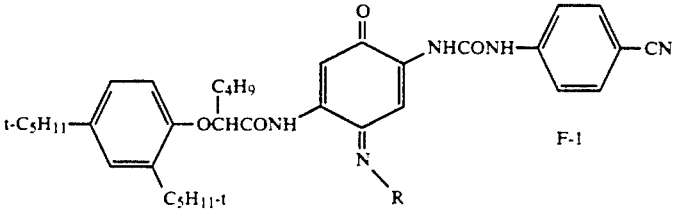 F-1 |
| 1d (Invention) | 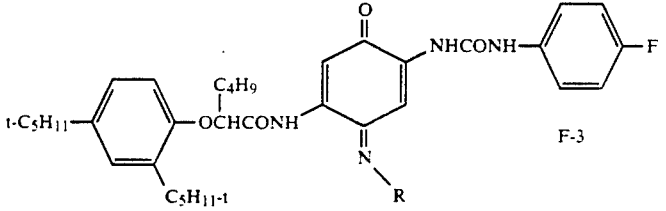 F-3 |
| 1e (Invention) | 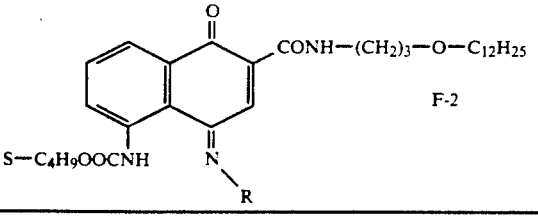 F-2 |

Ag(Br/I) emulsion containing 6.5 mol-% of iodide and having an average grain diameter of 0.6 μm, stabilized with 0.5 g of 4-hydroxy-6-methyl-1,3,3a,7-tetra-azaindene per 100 g of AgNO$_3$
2.0 g/m$^2$ of gelatine
0.85 g/m$^2$ of colourless coupler BG 30
0.82 g/m$^2$ of tricresylphosphate 3rd Layer (hardening and protective layer)
1.0 g/m$^2$ of gelatine
0.3 g/m$^2$ of hardener H1.

From each of the emulsions 1a to 1e to be cast,

A: one sample was first stored (unexposed) under normal atmospheric conditions (50% relative humidity, 20° C.) and then exposed, B: one sample was first exposed and then stored under the aforesaid normal atmospheric conditions, C: one sample was first stored (unexposed) under moist warm conditions (at 90% relative humidity, 35° C.) and then exposed and D: one sample was first exposed and then stored under the aforesaid moist, warm atmospheric conditions.

The storage time was 14 days and exposure was carried out with white light behind a grey step wedge, exposure time = 1/100 sec.

After this treatment (exposure, storage), the sample were processed by the colour negative process described below:

| Colour development | 3 min 15 sec | 38.0° C. |
|---|---|---|
| Bleaching | 4 min 20 sec | 38.0° C. |
| Washing | 1 min 05 sec | 38.0° C. |
| Fixing | 4 min 20 sec | 38.0° C. |
| Washing | 3 min 15 sec | 38.0° C. |
| Stabilization | 1 min 05 sec | 24.0° C. |
| Drying |  | <43° C. |
|  | 17 min 20 sec |  |

The colour development, bleaching, fixing and stabilization baths had the compositions shown below. The quantities given are based on 1000 ml.

| Colour development bath: | |
|---|---|
| Sodium tripolyphosphate | 2.0 g |
| Sodium sulphite (anhydrous) | 2.0 g |
| Sodium bicarbonate | 8.0 g |
| Potassium or sodium hydrogen sulphate | 7.0 g |
| Potassium bromide | 1.8 g |
| Potassium or sodium carbonate(anhydrous) | 30.0 g |
| Hydroxylamine sulphate | 3.0 g |
| $N^1$-Ethyl-$N^1$-(2-hydroxyethyl)-3-methyl 1,4-phenylene-diammonium sulphate (monohydrate) = CD 4 | 2.6 g |
| Water, to make up to 1000 ml | |
| pH = 10.2 | |
| Bleaching bath: | |
| Ethylene diaminotetracetic acid (sodium-iron salt) | 100.0 g |
| Potassium bromide | 50.0 g |
| 20% Ammonia solution | 6.0 g |
| Water to make up to 1000 m. | |
| pH = 5.9 to 6.1 | |
| Fixing bath: | |
| Ammonium thiosulphate | 120.0 g |
| Sodium sulphite (anhydrous) | 20.0 g |
| Potassium metabisulphite (crystalline) | 20.0 g |
| Water to make up to 1000 ml | |
| Stabilizing bath: | |
| Sulphosuccinic acid di-n-octyl ester (10% solution) | 10.0 ml |
| Formalin 35-37% | 6.0 ml |
| Water to make up to 1000 ml. | |

The results in terms of the sensitometric data measured behind a red filter (cyan maximum colour density and sensitivity) are summarized in the following Table.

Formulae of the substances used in Layer example 1:

Colourless coupler BG 30

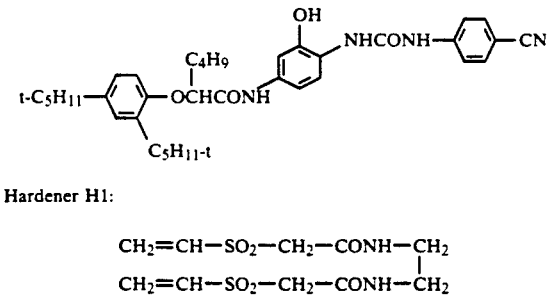

Hardener H1:

$$CH_2=CH-SO_2-CH_2-CONH-CH_2$$
$$CH_2=CH-SO_2-CH_2-CONH-CH_2$$

LAYER EXAMPLE 2

The layers described below were applied in the sequence given here to a transparent layer support of cellulose triacetate.

The quantities are based on 1 m². The quantities of silver halide applied are given in terms of the equivalent quantities of $AgNO_3$.

All the silver halide emulsions were chemically sulphur and gold ripened to maximum light sensitivity and stabilized with 0.4 g of 4-hydroxy-6-methyl-1,3,3a,7-tetraazaindene per 100 g of $AgNO_3$.

LAYER ARRANGEMENTS 2a–2e

1st Layer (Antihalation layer)
- 0.25 g/m² of black colloidal silver
- 1.3 g/m² gelatine
- 0.025 g/m² of cyan correction dye as indicated
- 0.4 g/m² of UV absorbent UV 1
- 0.05 g/m² of tricresylphosphate
- 0.03 g/m² of dibutylphthalate 2nd Layer (Micrate interlayer)
- 0.25 g of $AgNO_3$ of a Micrate-Ag (Br,I) emulsion: average grain diameter = 0.07 μm, 0.5 mol-% iodide
- 1.0 g/m² of gelatine
- 0.05 g/m² of coloured coupler RM
- 0.10 g/m² of tricresylphosphate 3rd Layer (layer with low red sensitivity)
- 2.8 g/m² of $AgNO_3$ of a spectrally red sensitized Ag(Br,I) emulsion, 4.5 mol-% iodide, average grain diameter = 0.45 μm
- 1.8 g/m² of gelatine
- 0.6 g/m² of colourless coupler BG 32
- 0.03 g/m² of DIR coupler DIR-25
- 0.04 g/m² of coloured coupler RM
- 0.36 g/m² of tricresylphosphate
- 0.16 g/m² of dibutylphthalate 4th Layer (layer with high red sensitivity)
- 2.4 g/m² of $AgNO_3$ of a spectrally red sensitized Ag(Br,I) emulsion, 8.0 mol-% iodide, average grain diameter = 0.8 μm

TABLE 1

Results of Layer example 1

| | Storage under normal atmospheric conditions (50% r.H., 20° C.) | | | | | | Moist, warm storage (90% r.H., 35° C.) | | | | | |
|---|---|---|---|---|---|---|---|---|---|---|---|---|
| | A: Exposure after storage | | B: Exposure before storage | | Difference (A-B) | | C: Exposure after storage | | D: Exposure before storage | | Difference (C-D) | |
| Sample No. | Sensitivity (DIN) | $D_{max}$ | Sensitivity (DIN) | $D_{max}$ | Sensitivity | $D_{max}$ | Sensitivity (DIN) | $D_{max}$ | Sensitivity (DIN) | $D_{max}$ | Sensitivity | $D_{max}$ |
| 1a | 23.8 | 2.67 | 23.2 | 2.60 | −0.6 | −0.07 | 23.4 | 2.62 | 20.6 | 1.73 | −2.8 | −0.89 |
| 1b | 23.6 | 2.63 | 22.9 | 2.59 | −0.7 | −0.04 | 23.4 | 2.60 | 20.4 | 1.59 | −3.0 | −1.01 |
| 1c | 23.7 | 2.65 | 23.6 | 2.64 | −0.1 | −0.01 | 23.5 | 2.65 | 23.2 | 2.60 | −0.3 | −0.05 |
| 1d | 23.8 | 2.69 | 23.6 | 2.67 | −0.2 | −0.02 | 23.3 | 2.66 | 22.9 | 2.59 | −0.4 | −0.07 |
| 1e | 23.7 | 2.68 | 23.5 | 2.66 | −0.2 | −0.02 | 23.4 | 2.66 | 23.0 | 2.60 | −0.4 | −0.06 |

91

-continued 1.5 g/m² of gelatine
0.12 g/m² of colourless coupler BG 33
0.02 g/m² of coloured coupler RM
0.01 g/m² of tricresylphosphate
0.08 g/m² of dibutylphosphate

5th Layer (separating layer)

0.8 g/m² of gelatine
0.05 g/m² of 2,5-di-t-pentadecyl hydroquinone
0.05 g/m² of tricresylphosphate
0.05 g/m² of dibutylphthalate

6th Layer (layer with low green sensitivity)

1.8 g/m² of AgNO₃ of a spectrally green sensitized Ag (Br,I) emulsion, 5.2 mol-% iodide, average grain diameter = 0.45 μm,
1.2 g/m² of gelatine
0.52 g/m² of colourless coupler PP 24
0.06 g/m² of DIR coupler DIR-25
0.15 g/m² of coloured coupler YM
0.6 g/m² of tricresylphosphate

7th Layer (layer with high green sensitivity)

2.0 g/m² of AgNO₃ of a spectrally green sensitized Ag (Br,I) emulsion, 8.5 mol-% iodide, average grain diameter 0.84 μm,
1.3 g/m² of gelatine
0.14 g/m² of colourless coupler PP 2
0.04 g/m² of coloured coupler YM
0.20 g/m² of tricresylphosphate

8th Layer (yellow filter layer)

0.04 g/m² of yellow colloidal silver, passivated with 6 mg of 1-phenyl-5-mercaptotetrazole/g of Ag
0.8 g/m² of gelatine
0.15 g/m² of 2,5-di-t-pentadecylhydroquinone
0.2 g/m² of tricresylphosphate

9th Layer (layer with low blue sensitivity)

0.65 g/m² of AgNO₃ of a spectrally blue sensitized Ag (Br,I) emulsion, 4.9 mol-% iodide, average grain diameter = 0.40 μm
1.0 g/m² of gelatine
0.75 g/m² of colourless coupler GB 24
0.20 g/m² of DIR coupler DIR-26
0.10 g/m² of DIR coupler DIR-25
0.30 g/m² of tricresylphosphate
0.25 g/m² of poly-ethylacrylate

10th Layer (layer with high blue sensitivity)

1.05 g/m² of AgNO₃ of a spectrally blue sensitized Ag (Br,I) emulsion, 9.0 mol-% iodide, average grain diameter = 0.9 μm
0.8 g/m² of gelatine
0.25 g/m² of colourless coupler GB 24
0.15 g/m² of tricresylphosphate
0.15 g/m² of polyethylacrylate

11th Layer (protective layer)

1.5 g/m² of gelatine
0.1 g/m² of UV absorbent UV 1
0.2 g/m² of UV absorbent UV 2
0.02 g/m² of tricresylphosphate
0.02 g/m² of dibutylphthalate

12th Layer (hardening protective layer)

0.5 g/m² of AgNO₃ of a Micrate-Ag(Br,I) emulsion, average grain diameter = 0.07 μm, 0.5 mol-% iodide,
1.2 g/m² of gelatine
0.4 g/m² of hardener (H2)
1.0 g/m² of formaldehyde acceptor (F)
0.25 g/m² of polymethacrylate particles, average diameter 1.5 μm.

92

The same cyan correction dyes are used in the first layer (antihalation layer) as in Layer example 1.

| Layer arrangement No. | Dye | |
|---|---|---|
| 2a | VF-1 | Comparison |
| 2b | VF-2 | comparison |
| 2c | F-1 | invention |
| 2d | F-3 | invention |
| 2e | F-2 | invention |

Formulae of substances used in Layer example 2:

UV Absorbent UV 1

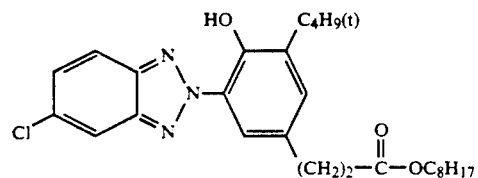

Coloured Coupler RM

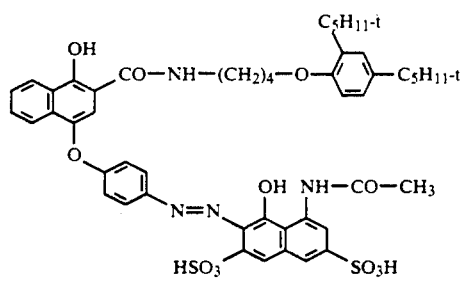

Colourless Coupler BG32

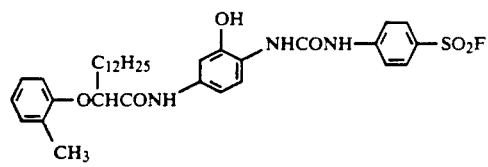

Colourless Coupler BG 33

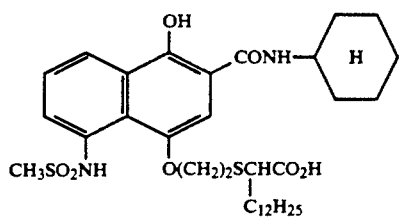

Colourless Coupler PP 24

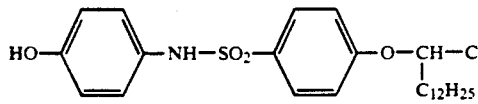
Colourless Coupler PP 2
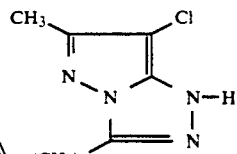
DIR Coupler DIR 26
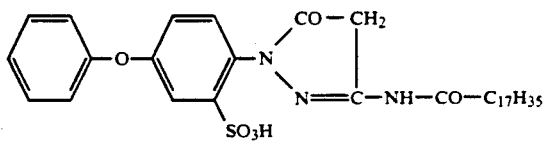
Coloured Coupler YM
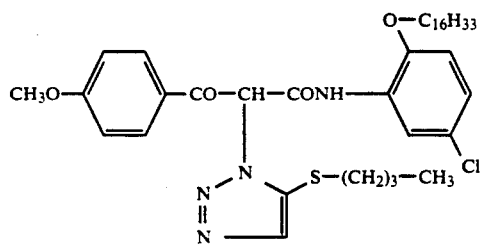
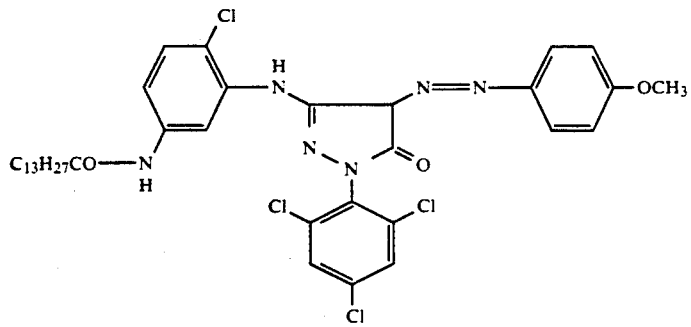
Colourless Coupler GB 24
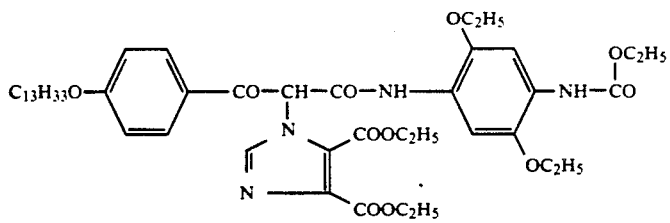
Hardener H2
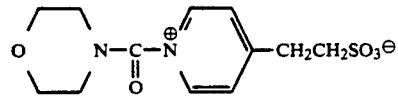
Formaldehyde Acceptor (F)
DIR Coupler DIR 25
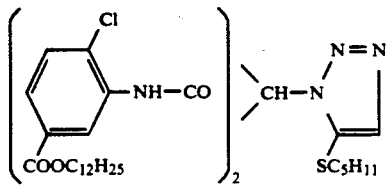
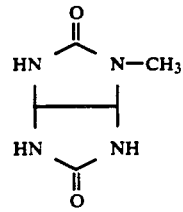

TABLE 2

| | Results of Layer example 2 | | | | | |
| --- | --- | --- | --- | --- | --- | --- |
| | Storage under normal atmospheric conditions (50% r.H., 20° C.) | | | Moist. warm storage (90% r.H., 35° C.) | | |
| Sample No. | Exposure after storage A: $D_{max}$ | Exposure before storage B: $D_{max}$ | Difference (A-B) | Exposure after storage C: $D_{max}$ | Exposure before storage D: $D_{max}$ | Difference (C-D) |
| Comparison | | | | | | |
| 2a | 2.45 | 2.36 | −0.09 | 2.42 | 1.80 | −0.62 |
| 2b | 2.48 | 2.42 | −0.06 | 2.40 | 1.72 | −0.68 |
| Invention | | | | | | |
| 2c | 2.44 | 2.41 | −0.03 | 2.42 | 2.34 | −0.08 |
| 2d | 2.46 | 2.41 | −0.05 | 2.41 | 2.34 | −0.07 |
| 2e | 2.47 | 2.42 | −0.05 | 2.45 | 2.36 | −0.09 |

The Examples clearly show that the cyan correction dyes according to the invention effectively reduce the reduction in sensitivity and in maximum density during storage of the exposed photographic material under tropical conditions. Oxidative destruction of the latent image nuclei thus no longer takes place.

We claim:

1. Color photographic recording material having a layer support and at least three light-sensitive silver halide emulsion layers differing in their spectral sensitivity applied to said layer support, which silver halide emulsion layers are spectrally associated with, respectively, a cyan coupler, a magenta coupler and a yellow coupler, characterised in that the colour photographic recording material contains, as cyan correction dyes, azomethine dyes corresponding to the general formula (IV)

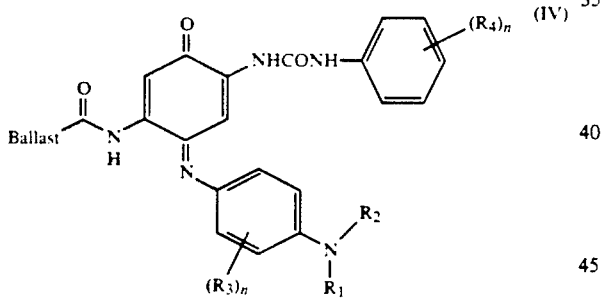

wherein
$R_1$ and $R_2$ denote H, and optionally substituted $C_1-C_4$-alkyl, $C_6-C_{10}$-aryl and $C_1-C_3$-alkoxy,
$R_3$ denotes H, and optionally substituted $C_1-C_4$-alkyl, $C_6-C_{10}$-aryl and $C_1-C_3$-alkoxy and halogen,
$R_4$ denotes H, optionally substituted $C_1-C_4$-alkyl and $C_1-C_3$-alkoxy, CN, halogen, $SO_2R_7$, $COOR_7$, $SO_2OR_7$, $COR_7$, $SO_2NR_7R_8$ and $CONR_7R_8$,
$R_7$ denotes optionally substituted $C_1-C_4$-alkyl and $C_6-C_{10}$-aryl,
$R_8$ denotes H, or together with $R_8$ a five-membered or six-membered, optionally substituted ring,
Ballast denotes conventional ballast groups and n denotes 1 or 2.

2. Color photographic recording material according to claim 1 wherein the cyan correction dye is incorporated in a layer which is arranged closer to the support than any light-sensitive layer.

3. Colour photographic recording material according to claim 1, characterized in that the cyan correction dyes IV are obtained by oxidative coupling of p-phenylenediamine derivatives corresponding to the general formula (I)

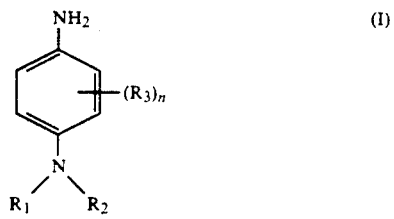

with cyan couplers of the general formula (II)

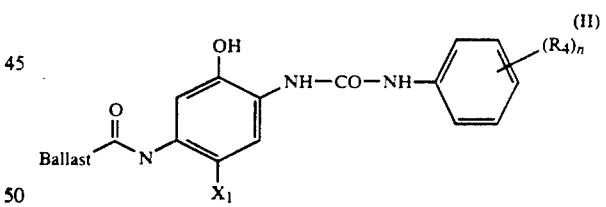

in which the substituents $R_1$ to $R_4$, n and Ballast have the meanings indicated in claim 4, and $X_1$ denotes H, F, Cl and optionally substituted $C_1-C_4$-alkoxy.

* * * * *